US009369283B2

(12) United States Patent
Chen

(10) Patent No.: US 9,369,283 B2
(45) Date of Patent: Jun. 14, 2016

(54) METHOD FOR ENTERING PASSWORD AND PORTABLE ELECTRONIC DEVICE AND UNLOCKING METHOD AND DATA AUTHENTICATING METHOD

(75) Inventor: Meng-Chang Chen, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 334 days.

(21) Appl. No.: 13/603,437

(22) Filed: Sep. 5, 2012

(65) Prior Publication Data

US 2014/0025957 A1 Jan. 23, 2014

(30) Foreign Application Priority Data

Jul. 19, 2012 (TW) .............................. 101126062 A

(51) Int. Cl.
*G06F 21/00* (2013.01)
*H04L 9/32* (2006.01)
(Continued)

(52) U.S. Cl.
CPC ............ *H04L 9/3226* (2013.01); *H04L 63/083* (2013.01); *H04W 12/06* (2013.01); *H04W 12/02* (2013.01); *H04W 88/02* (2013.01)

(58) Field of Classification Search
CPC ....... G06F 21/31; G06F 21/316; G06F 21/32; G06F 21/34; G06F 21/36; G06F 21/40; G06F 21/44; H04L 9/32; H04L 9/3226; H04L 9/3234
USPC ............................ 726/4–5, 16–19, 21, 27–28; 713/182–186
See application file for complete search history.

(56) References Cited

U.S. PATENT DOCUMENTS

2006/0053301 A1* 3/2006 Shin ....................... G06F 21/36
713/183
2007/0198843 A1* 8/2007 Cradick ................ G06F 1/1613
713/182

(Continued)

FOREIGN PATENT DOCUMENTS

| CN | 102394978 | 3/2012 |
| TW | 200847728 | 12/2008 |
| TW | 200900987 | 1/2009 |

OTHER PUBLICATIONS

"Office Action of Taiwan Counterpart Application", issued on Aug. 8, 2014, p. 1-p. 12.

(Continued)

*Primary Examiner* — Amir Mehrmanesh
*Assistant Examiner* — Quy Pham
(74) *Attorney, Agent, or Firm* — Jianq Chyun IP Office

(57) ABSTRACT

A method for entering password and a portable electronic device using the same, a method for unlocking the portable electronic device and a data authenticating method are provided, wherein the portable electronic device includes a touch screen. The method includes displaying an interface for entering a somatosensory password, measuring and recording at least one angle variation of the portable electronic device on at least one dimension, and generating a somatosensory signal data set according to the at least one angle variation of the portable electronic device on the at least one dimension. The method further includes generating a user password data according to the somatosensory signal data set, encrypting the user password data according to an encryption algorithm to generate an encrypted user password data, and transmitting the encrypted user password data to an authentication unit.

29 Claims, 14 Drawing Sheets

(51) Int. Cl.
*H04L 29/06* (2006.01)
*H04W 12/06* (2009.01)
*H04W 12/02* (2009.01)
*H04W 88/02* (2009.01)

(56) References Cited

U.S. PATENT DOCUMENTS

| | | | | |
|---|---|---|---|---|
| 2008/0214298 A1* | 9/2008 | Byng | ................... | G07F 17/32 463/29 |
| 2011/0145587 A1* | 6/2011 | Park | ................... | G06F 21/36 713/182 |
| 2012/0124662 A1* | 5/2012 | Baca | ................... | G06F 21/32 726/17 |
| 2012/0126940 A1* | 5/2012 | Coggill | ................... | G06F 21/36 340/5.54 |
| 2012/0249295 A1* | 10/2012 | Yeung | ................... | G06F 3/04883 340/5.54 |
| 2012/0260311 A1* | 10/2012 | Kang | ................... | G06F 3/0346 726/3 |
| 2013/0263235 A1* | 10/2013 | Daigle | ................... | G06F 21/35 726/6 |
| 2013/0263251 A1* | 10/2013 | Fleizach | ................... | G06F 3/04883 726/19 |

OTHER PUBLICATIONS

"Office Action of China Counterpart Application", issued on Dec. 21, 2015, p. 1-p. 13.

* cited by examiner

METHOD FOR ENTERING PASSWORD AND PORTABLE ELECTRONIC DEVICE AND UNLOCKING METHOD AND DATA AUTHENTICATING METHOD

CROSS-REFERENCE TO RELATED APPLICATION

This application claims the priority benefit of Taiwan application serial no. 101126062, filed on Jul. 19, 2012. The entirety of the above-mentioned patent application is hereby incorporated by reference herein and made a part of this specification.

BACKGROUND

1. Technology Field

The present invention relates to a method for entering password generated using a somatosensory signal, a portable electronic device using the same, a method for unlocking the portable electronic device using the somatosensory signal and a data authenticating method.

2. Description of Related Art

With recent advancement in mobile communication technology, the concept of processing online transactions or other online services using a smart phone is gradually popularized. Accordingly, the accompanied risks for adopting the concept may also be increased. For example, in the case where a user enters a password by touching a virtual keyboard displayed on a touch screen of the smart phone, while the user is entering the password, a malicious program may directly capture the password entered by the user through a skimming method and transmit the password to a remote host. Particularly, most of the user may not be aware of that the smart phones they are using have already been infected by the one or more malicious programs.

Traditionally, in order to determine the numerals or letters entered by the user based on digital data captured, information or position corresponding to each key on a virtual keyboard or a physical keyboard of the smart phone must be obtained by the malicious program in advance. The skimming method of said malicious program is relatively simple and may be prevented by using a dynamic keyboard technology so that the malicious program may not directly obtains a corresponding character from a fixed coordinate or a fixed string.

However, as devil is always one step ahead, the malicious program nowadays may accurately identifies a virtual keyboard or an anti-hacking pattern (e.g., a distorted numeral) displayed on the touch screen through image identifying technologies. As a result, effectiveness of preventing skimming using a dynamic keyboard is gradually reduced.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

A method for entering password and a portable electronic device using the same are provided, which may substantially reduce the risk of an unlocking password being skimmed while entering the password.

An unlocking method is provided, which may substantially reduce the risk of an unlocking password being skimmed while entering the password.

An exemplary embodiment of the present invention provides a method of entering password for a portable electronic device having a touch screen. The method includes displaying an interface for entering a somatosensory password, measuring and recording at least one angle variation of the portable electronic device on at least one dimension, and generating a somatosensory signal data set according to the at least one angle variation of the portable electronic device on the at least one dimension. The method also includes generating a user password data according to the somatosensory signal data set, encrypting the user password data according to an encryption algorithm to generate an encrypted user password data. The method further includes transmitting the encrypted user password data to an authentication unit, in which the authentication unit decrypts the encrypted user password data according to a decryption algorithm to obtain the user password data, and verifies a user identification of the portable electronic device according to the obtained user password data.

An exemplary embodiment of the present invention provides a portable electronic device including a touch screen, a touch screen control circuit, a gravity measuring circuit, a data storing circuit, a somatosensory signal generating circuit, a user password data generating circuit, an encrypting circuit and a communication interface circuit. The touch screen control circuit is coupled to the touch screen and configured to control the touch screen to display an interface for entering somatosensory password. The gravity measuring circuit is configured to measure at least one angle variation of the portable electronic device on at least one dimension. The data storing circuit is coupled to the gravity measuring circuit and configured to record the at least one angle variation of the portable electronic device on the at least one dimension. The somatosensory signal generating circuit is coupled to the data storing circuit and configured to generate a somatosensory signal data set according to the at least one angle variation on the at least one dimension of the portable electronic device. The user password data generating circuit is coupled to the somatosensory signal generating circuit and configured to generate a user password data according to the somatosensory signal data set. The encrypting circuit is coupled to the user password data generating circuit and configured to encrypt the user password data according to an encryption algorithm to generate an encrypted user password data. The communication interface circuit is coupled to the encrypting circuit and configured to transmit the encrypted user password data to an authentication unit.

An exemplary embodiment of the present invention provides an unlocking method for a portable electronic device having a touch screen. The unlocking method including: displaying an initiate unit on the touch screen if the touch screen is in the unlock state. The unlocking method further includes: measuring and recording at least one angle variation of the portable electronic device on at least one dimension if the touch signal corresponding to the initiate unit has been sensed; and generating a somatosensory signal data set according to the at least one angle variation on the at least one dimension of the portable electronic device and generating a user password data according to the somatosensory signal data set. The unlocking method further includes, determining whether the user password data is identical to a preset content; and switching the touch screen to an unlock state if the user password data is identical to the preset content.

An exemplary embodiment of the present invention provides a data authenticating method for a portable electronic device, in which the portable electronic device has a touch screen, the data authenticating method including: locking the preset functional module and displaying an interface for entering somatosensory password. The unlocking method also includes: measuring and recording at least one angle variation of the portable electronic device on at least one dimension if the touch signal corresponding to the initiate unit has been sensed; and generating a somatosensory signal data set according to the at least one angle variation of the portable electronic device on the at least one dimension. The unlocking method further includes: generating the user password data according to the somatosensory signal data set and transmitting the user password data to an authentication unit, in which the authentication unit has an authentication code, the authentication unit performs a verification to a user identification of the portable electronic device according the authentication code and the obtained user password data, and permits the preset functional module for executing after the user identification has been verified.

Based on above, in the exemplary embodiments of the present invention, the method for entering password and the portable electronic device using the same generates the somatosensory signal data set by measuring at least one angle variation of the portable electronic device on at least one dimension, and generating the user password data by using the user password data. Next, the user password data is encrypted and transmitted to an authentication unit to verify the user identification. Additionally, in the exemplary embodiments of the present invention, the unlocking method switches the touch screen to an unlock state if the user password data is identical to the preset content. Further, in the exemplary embodiments of the present invention, the data authenticating method may verify the current user identification of the portable electronic device by using the user password data, thereby determining whether to permit the corresponding function to be executed. As a result, the risk of an unlocking password (i.e., the user password data) being skimmed may be substantially reduced.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the present invention more comprehensible, several embodiments accompanied with drawings are described in detail as follows.

DESCRIPTION OF THE EMBODIMENTS

Figure 1:
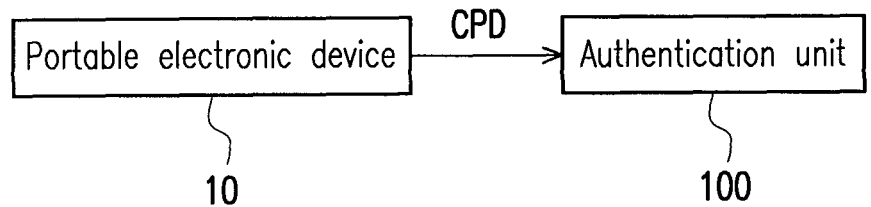
FIG. 1 is a schematic diagram illustrating a password authentication system according to a first exemplary embodiment of the present invention.

In order to reduce the risk of password being skimmed while using the traditional password input interface for entering password, the embodiments of the present invention provide a method for entering password, which may generate a somatosensory signal data set according to a variation of rotation angle or a variation of tilt angle of the portable electronic device, thereby encrypting and transmitting the somatosensory signal data set using an encryption mechanism. Based on above, confidentiality of entering and transmitting password using the portable electronic device may be effectively increased. In addition, the embodiments of the present invention also provide an unlocking method, which may unlock the portable electronic device by identifying a rotation angle or a tilt angle thereof, such that confidentiality and convenience if using the portable electronic device may be substantially increased. Several exemplary embodiments will be described in details in the following with reference to accompany the drawings.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1 is a schematic diagram illustrating a password authentication system according to a first exemplary embodiment of the present invention.

Referring to FIG. 1, a portable electronic device 10 may be a cellular phone, a personal digital assistant (PDA), a smart phone, an e-book, handheld game console or a tablet computer.

Generally, if a user of the portable electronic device 10 intended to pass a verification of an authentication unit 100 to access a specific online service, the portable electronic device 10 may be used to encrypt a user password data according to an encryption algorithm and transmit the user password data being encrypted CPD (hereinafter, the encrypted user password data CPD) to the authentication unit 100. Next, after receiving the encrypted user password data CPD, the authentication unit 100 may obtain the original user password data by decrypting the encrypted user password data CPD according to a corresponding decryption algorithm. Based on above, the authentication unit 100 may verify a user identification of the portable electronic device 10 according to the user password obtained. For example, if a user of a smart phone intended to log onto Google for accessing the online services thereof, the user may transmit a user verification message (i.e., the encrypted user password data CPD) to an authentication unit of Google. Next, if the user verification message passes the verification of the authentication server, a login-permit message is transmitted from the authentication unit of Google to establish a two-way connection for the user to access the online service that the user intended to use.

Figure 2:
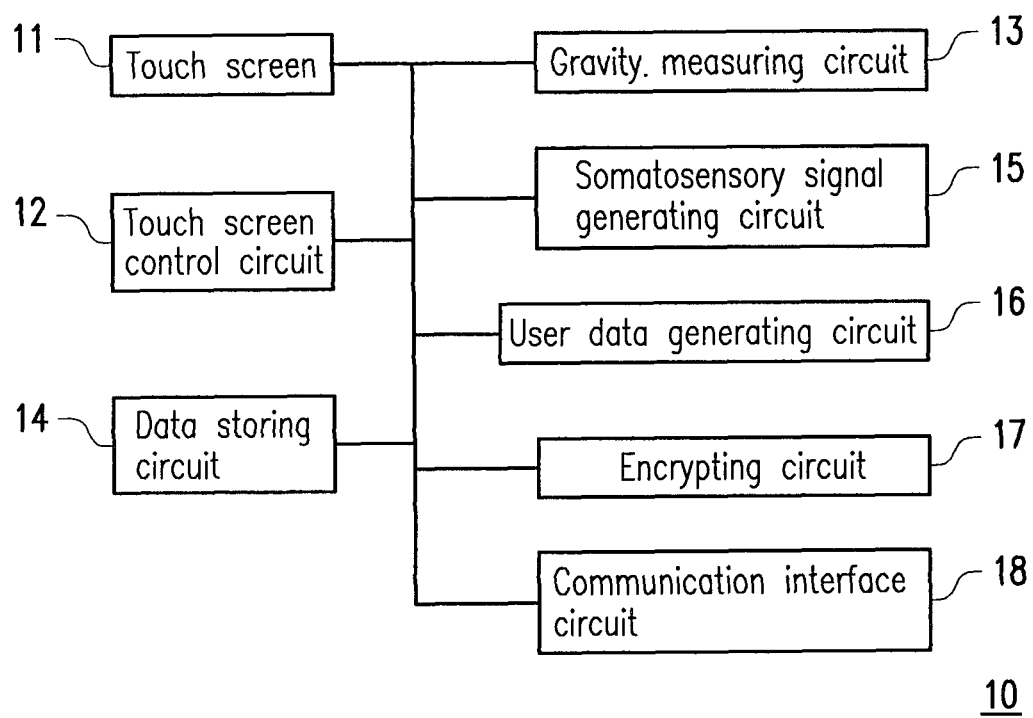
FIG. 2 is a schematic block diagram illustrating a portable electronic device according to the first exemplary embodiment of the present invention.

FIG. 2 is a schematic block diagram illustrating a portable electronic device according to the first exemplary embodiment of the invention.

Referring to FIG. 2, the portable electronic device 10 includes a touch screen 11, a touch screen control circuit 12, a gravity measuring circuit 13, a data storing circuit 14, a somatosensory signal generating circuit 15, a user password data generating circuit 16, an encrypting circuit 17 and a communication interface circuit 18.

The touch screen 11 is an interface for entering operating commands and displaying output signals. For example, the user may enter characters or commands by clicking or sliding on the touch screen 11 using a stylus or a finger. In the present exemplary embodiment, the touch screen 11 may be a resistive touch panel, a capacitive touch panel, an optical touch panel, an acoustic wave touch panel, an electromagnetic touch panel, the type of the touch screen is not particularly limited thereto.

The touch screen control circuit 12 is coupled to the touch screen 11 and configured for controlling the touch screen to display a screen and to receive a touch message detected by the touch screen 11. More specifically, the touch screen control circuit 12 may be a touch-sensitive screen controller.

The gravity measuring circuit 13 is configured to measure a tilt angle of a body of the portable electronic device and converting the tilt angle measured to an angle variation data. In the present exemplary embodiment, the gravity measuring circuit 13 may include a g-sensor or an accelerometer.

The data storing circuit 14 is coupled to the gravity measuring circuit 13 for storing the angle variation data or other data generated by the gravity measuring circuit 13. In the present exemplary embodiment, the data storing circuit 14 may be a Read Only Memory (ROM), a dynamic random access memory (DRAM) or a static random access memory (SRAM), the type of the data storing circuit 14 is not limited thereto.

The somatosensory signal generating circuit 15 is coupled to the data storing circuit 14. The somatosensory signal generating circuit 15 is configured to read the angle variation data generated by the gravity measuring circuit 13 from the data storing circuit 14, thereby generating a somatosensory signal data set. Herein, the somatosensory signal data set may be composed by one or more angel variation data corresponding to the portable electronic device 10.

The user password data generating circuit 16 is coupled to the somatosensory signal generating circuit 15 and configured to generate a user password data according to the somatosensory signal data set generated by the somatosensory signal generating circuit 15. For example, a remote host (e.g., the authentication unit 100) may verify the user identification of the portable electronic device 10 according to said user password data.

The encrypting circuit 17 is coupled to the user password data generating circuit 16 and configured to encrypt the user password data according to an encryption algorithm to generate an encrypted user password data. In the present exemplary embodiment, the encryption algorithm used by the encrypting circuit 17 may be symmetric encryption/decryption algorithms, such as AES or DES. In addition, the encryption algorithm used by the encrypting circuit 17 may also be asymmetric encryption algorithms, such as RSA or hash algorithm.

The communication interface circuit 18 is coupled to the encrypting circuit 17 and configured to connect the portable electronic device 10 and the wired/wireless network and receiving/transmitting wired/wireless signals. In the present exemplary embodiment, the communication interface circuit 18 may include a RF circuit and/or a network interface card.

Figure 3:
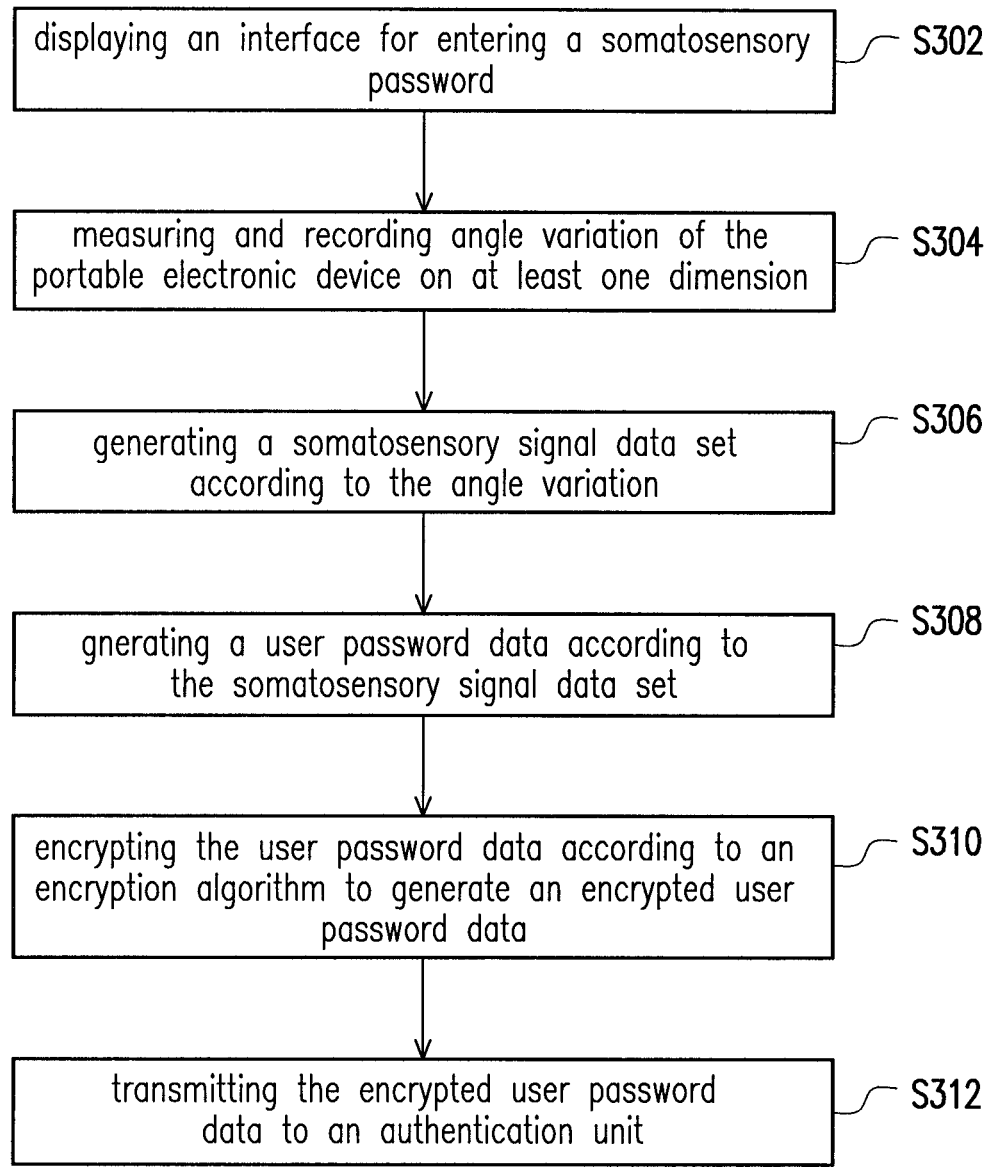
FIG. 3 is a flowchart illustrating a method of entering password according to the first exemplary embodiment of the present invention.

FIG. 3 is a flowchart illustrating a method of entering password according to the first exemplary embodiment of the present invention.

Referring to FIG. 3, in step S302, the touch screen control circuit 12 is controlled to lock a preset functional module (not illustrated) and an interface for entering somatosensory password is displayed on the touch screen 11, which prompts that a somatosensory password may now be entered by the user. In the present exemplary embodiment, the preset functional module may be, for example, a non-password identifying module, a communication module and a network module.

Next, in step S304, the gravity measuring circuit 13 may start measuring the angle variation of the portable electronic device 10 on one or more dimensions, and converting the measured angle variation and a count thereof to the angle variation data and recording the angle variation data to the data storing circuit 14.

Next, in step S306, the somatosensory signal generating circuit 15 generates a somatosensory signal data set according to the angle variation of the portable electronic device 10 on one or more dimensions and the count thereof. For example, in the present exemplary embodiment, the somatosensory signal generating circuit 15 may determine whether to generate a corresponding somatosensory signal according to a plurality of threshold values corresponding to a plurality of orientations.

Figure 4A:
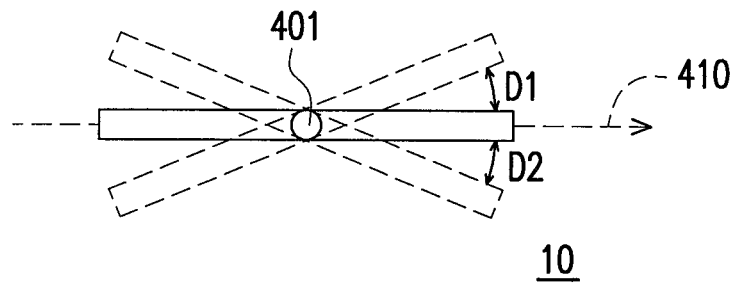
FIG. 4A, FIG. 4B and FIG. 4C are schematic diagrams illustrating a somatosensory signal data set generated based on an angle variation of the portable electronic device according to the first exemplary embodiment of the present invention.
Figure 4B:
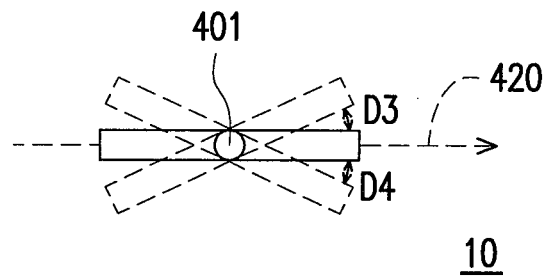
Figure 4C:
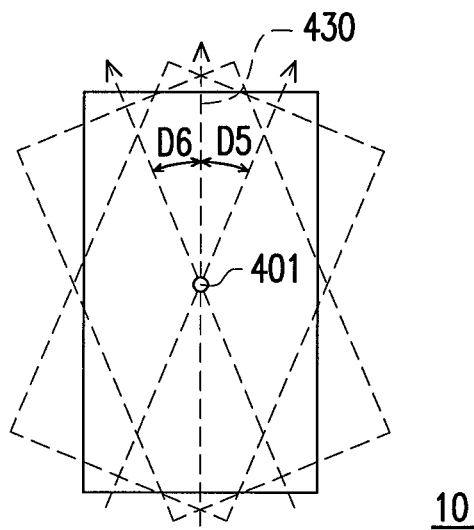

FIG. 4A, FIG. 4B and FIG. 4C are schematic diagrams illustrating a somatosensory signal data set generated based on an angle variation of the portable electronic device according to the first exemplary embodiment of the present invention. It should be noted that, the following examples are exemplified using a smart phone, in which an orientation towards the speaker end of the smart phone is referred to as a body orientation.

Referring to FIG. 4A, the body orientation of the portable electronic device 10 is pointing towards a first orientation 410 (e.g., due north), and a first included angle of the body between the first orientation 410 and a horizontal line is generated by tilting the portable electronic device 10 with a body center 401 as an axis. Further, the angle variation data corresponding to the first included angle is recorded to the data storing circuit 14 through the gravity measuring circuit 13. It should be noted that, herein an included angle above the horizontal line and between the body orientation (i.e., the first orientation 410) of the portable electronic device 10 and the horizontal line is set as a positive included angle (0 degree to 90 degrees), whereas an included angle below the horizontal line and between the body orientation (i.e., the first orientation 410) of the portable electronic device 10 and the horizontal line is set as a negative included angle (−90 degrees to 0 degrees).

Next, the somatosensory signal generating circuit 15 adds a first message correspondingly to the somatosensory signal data set (which is generated by the somatosensory signal generating circuit 15) if the first included angle is larger than a first threshold value D1 (e.g., 10 degrees). Or, the somatosensory signal generating circuit 15 adds a second message correspondingly to the somatosensory signal data set (which is generated by the somatosensory signal generating circuit 15) if the first included angle is smaller than a second threshold value D2 (e.g., −10 degrees).

Referring to FIG. 4B, in which the body orientation of the portable electronic device 10 is still pointing towards the first orientation 410 (e.g., due north) of FIG. 4A, and a second included angle of the body between a second orientation 420 (e.g., due east) and the horizontal line is generated by tilting the portable electronic device 10 with the body center 401 as an axis. Further, the angle variation data corresponding to the second included angle is recorded into the data storing circuit 14 through the gravity measuring circuit 13. It should be noted that, in order to prevent confusion while generating the somatosensory signal, it is set that the second orientation 420 is vertical to the first orientation 410 of FIG. 4.

In addition, similar to the setting of FIG. 4A, herein an included angle above the horizontal line and between the second orientation 420 of the portable electronic device 10 and the horizontal line is set as a positive included angle (0 degree to 90 degrees), whereas an included angle below the horizontal line and between the second orientation 420 of the portable electronic device 10 and the horizontal line is set as a negative included angle (−90 degrees to 0 degrees). Next, the somatosensory signal generating circuit 15 adds a third message correspondingly to the somatosensory signal data set (which is generated by the somatosensory signal generating circuit 15) if the second included angle is larger than a third threshold value D3 (e.g., 10 degrees). Or, the somatosensory signal generating circuit 15 adds a fourth message correspondingly to the somatosensory signal data set (which is generated by the somatosensory signal generating circuit 15) if the second included angle is smaller than a fourth threshold value D4 (e.g., −10 degrees).

Referring to FIG. 4C, in which the portable electronic device 10 is horizontally placed, and the body orientation of the portable electronic device 10 is now pointing towards a third orientation 430 (e.g., due north), and a third included angle between the body orientation and the third orientation 430 (e.g., due north) on the horizontal line is generated by horizontally rotating the portable electronic device 10 with the body center 401 as an axis. Further, the angle variation data corresponding to the third included angle is recorded into the data storing circuit 14 through the gravity measuring circuit 13.

It should be noted that, herein an included angle between the body orientation of the portable electronic device 10 and the third orientation 430 is set as a positive included angle (0 degree to 90 degrees) if horizontally rotating the body of the portable electronic device 10 towards one side (e.g., due east). Whereas an included angle between the body orientation of the portable electronic device 10 and the third orientation 430 is set as a negative included angle (0 degree to 90 degrees) if horizontally rotating the body of the portable electronic device 10 towards another side (e.g., due west). Next, the somatosensory signal generating circuit 15 adds a fifth message correspondingly to the somatosensory signal data set (which is generated by the somatosensory signal generating circuit 15) if the third included angle is larger than a fifth threshold value D5 (e.g., 10 degrees). Or, the somatosensory signal generating circuit 15 adds a sixth message correspondingly to the somatosensory signal data set (which is generated by the somatosensory signal generating circuit 15) if the third included angle is smaller than a sixth threshold value D6 (e.g., −10 degrees).

In regard to the method for recording the first message to the sixth message, for example, the somatosensory signal generating circuit 15 may convert the angle variation data recorded by the gravity measuring circuit 13 in a form of (x, y). In which, x represents the type of the somatosensory signal and y represents a count of somatosensory signal occurred.

For the convenience of explanation, Table 1 is illustrated to further describe the method for respectively recording the first message to the sixth message.

TABLE 1

|  | The first included angle is larger than the first threshold value | The first included angle is smaller than the first threshold value | The second included angle is larger than the third threshold value | The second included angle is smaller than the fourth threshold value | The third included angle is larger than the fifth threshold value | The third included angle is smaller than the sixth threshold value |
| --- | --- | --- | --- | --- | --- | --- |
| Occurred once | (1, 1) | (2, 1) | (3, 1) | (4, 1) | (5, 1) | (6, 1) |
| Occurred twice | (1, 2) | (2, 2) | (3, 2) | (4, 2) | (5, 2) | (6, 2) |

Referring to Table 1, for example, after the somatosensory signal detection is started and before the detection is completed, if the number of times (count) that the first included angle of FIG. 4A being larger to the first threshold value occurred for once, the somatosensory signal generating circuit may then adds the first message in the from of (1, 1) to the somatosensory signal data set. In other words, if the number of times (count) that the first included angle of FIG. 4A being larger to the first threshold value occurred for N times, simply just changing the first message to (1, N). Similarly, the rest of the second message to the sixth message may be changed with the same method in accordance to Table 1. For example, if the number of times (count) that the first included angle of FIG. 4B being smaller to the first threshold value occurred for M times, the second message recorded by the somatosensory signal generating circuit 15 may be (2,M). In another exemplary embodiment, in order to ensure the same somatosensory signal are successively inputted, the somatosensory signal generating circuit 15 only cumulatively adds the number of times (count) if receiving the same somatosensory signal successively. If the next somatosensory signal received is different from the last one, the previous number of times is returned to zero, so it is omitted hereinafter.

Nevertheless, the present invention should not be construed as limited to the embodiments set forth herein. For example, in order to determine whether to add the first message or the second message, the somatosensory signal generating circuit 15 may also determine whether the included angle above the horizontal line and between the body direction (i.e., the first direction 410) of the portable electronic device 10 and the horizontal line falls within the range of 0 degree to 90 degrees and the number of times (count) it occurs. If the determination is positive, the somatosensory signal generating circuit 15 adds the first message to the somatosensory signal data set (which is generated by the somatosensory signal generating circuit 15). In addition, if the included angle below the horizontal line and between the body direction (i.e., the first direction 410) of the portable electronic device 10 and the horizontal line falls within the range of −90 degrees to 0 degree and the number of time if it occurs, the somatosensory signal generating circuit 15 adds the second message to the somatosensory signal data set (which is generated by the somatosensory signal generating circuit 15). Similarly, the rest of the second message to the sixth message may be added with the same method, so it is omitted hereinafter.

Referring back to FIG. 3, in step S308, the user password data generating circuit 16 generates a user password data according to the somatosensory signal data set. For example, the user password data generating circuit 16 may convert the somatosensory signal data set having a plurality of the above mentioned messages to a plurality of data. Next, in step S310, the encrypting circuit 17 encrypts the user password data according to an encryption algorithm to generate an encrypted user password data.

Next, in step S312, the communication interface circuit 18 transmits the encrypted user password data to the authentication unit 100. In the present exemplary embodiment, the authentication unit 100 may obtain the original user password data by decrypting the encrypted user password data according to a corresponding decryption algorithm, and a user identification of the portable electronic device 10 may be verified according to the user password obtained, so that the preset functional module may be unlocked for the user once the user identification is confirmed.

Second Exemplary Embodiment

The hardware structure of the second exemplary embodiment is substantially the same to the hardware structure used in the first exemplary embodiment, their difference lies where: In the second exemplary embodiment, the user may notify the portable electronic device to start detecting and recording the angle variation of the portable electronic device by clicking an initiate unit for entering somatosensory password. Next, after clicking an initiate unit for entering somatosensory password, the user may notify the portable electronic device to start generating the somatosensory signal data set according to the angle variation by clicking a confirm unit. Based on above, the portable electronic device may clearly identify the starting point and the end point for detecting the somatosensory password, frequency of misjudgment may be reduced accordingly.

Figure 5:
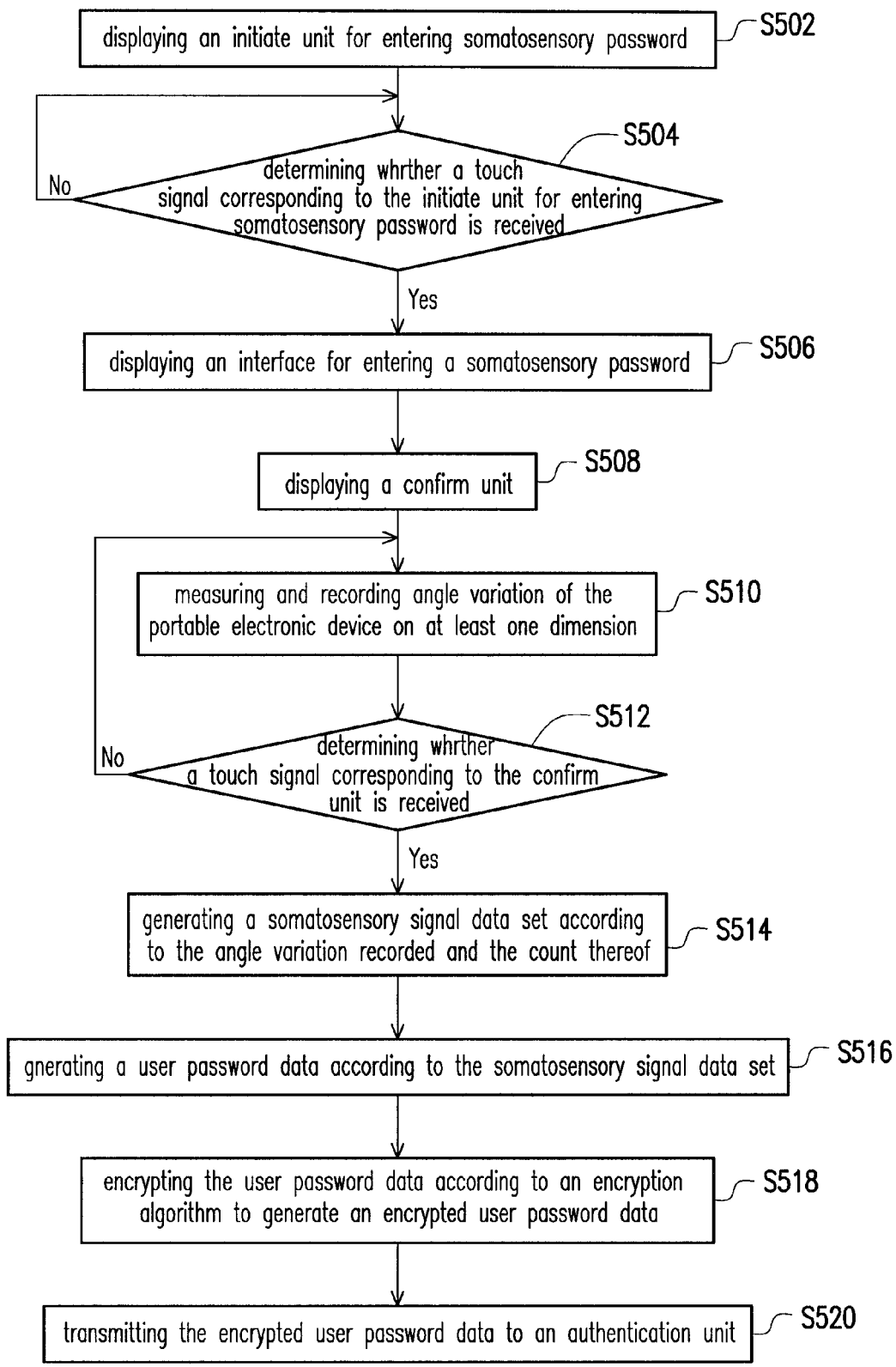
FIG. 5 is a flowchart illustrating a method of entering password according to a second exemplary embodiment of the present invention.

FIG. 5 is a flowchart illustrating a method of entering password according to a second exemplary embodiment of the present invention.

Referring to FIG. 5, in step S502, the touch screen control circuit 12 controls the touch screen 11 to display the initiate unit for entering somatosensory password. In which, the initiate unit for entering somatosensory password may be displayed on a fixed position or displayed randomly on any position on the touch screen 11, the invention is not limited thereto. In step S504, the touch screen control circuit 12 determines whether a touch signal corresponding to the initiate unit for entering somatosensory password is received.

Step S504 may be repeated by the touch screen control circuit 12 if the touch signal corresponding to the initiate unit for entering somatosensory password is not received by the touch screen control circuit 12.

If the touch signal corresponding to the initiate unit for entering somatosensory password is received by the touch screen control circuit 12, in step S506, the touch screen control circuit 12 controls the touch screen 11 to display the initiate unit for entering somatosensory password.

In step S508, the touch screen control circuit 12 controls the touch screen 11 to display the confirm unit. Next, in step S510, the gravity measuring circuit 13 may start measuring the angle variation of the portable electronic device 10 on one or more dimensions, and converting the measured angle variation and a count thereof to the angle variation data and recording the angle variation data to the data storing circuit 14. In step S512, the touch screen control circuit 12 determines whether a touch signal corresponding to the confirm unit is received.

Step S510 and step S512 may be repeated by the touch screen control circuit 12 if the touch signal corresponding to the confirm unit is not received by the touch screen control circuit 12.

If the touch signal corresponding to the confirm unit is received by the touch screen control circuit 12, in step S514, the somatosensory signal generating circuit 15 generates the somatosensory signal data set according to the angle variation on the dimension and the number of times of the angle variations of the portable electronic device 10.

Next, in step S516, the user password data generating circuit 16 generates the user password data according to the somatosensory signal data set.

In particular, in the present exemplary embodiment, the composition of the user password data may also include the touch signals of the initiate unit for entering somatosensory password and the confirm unit. For example, in step S516, after obtaining the somatosensory signal data set, the user password data generating circuit 16 may compose data corresponding to the touch signal of the initiate unit for entering somatosensory password, the somatosensory signal data set and the data corresponding to the touch signal of the confirm unit in a preset order to generate the user password data.

Next, in step S518, the encrypting circuit 17 encrypts the user password data according to an encryption algorithm to generate an encrypted user password data. Lastly, in step S520, the communication interface circuit 18 transmits the encrypted user password data to the authentication unit 100.

Third Exemplary Embodiment

The hardware structure of the second exemplary embodiment is similar to the hardware structure used in the first exemplary embodiment, their difference lies where: In the third exemplary embodiment, the portable electronic device further includes an input password generating circuit being configured for receiving the password entered by the user. Based on above, the user password data generating circuit may generate the user password data according to the somatosensory signal data set and the input password set, thereby increasing.

Figure 6:
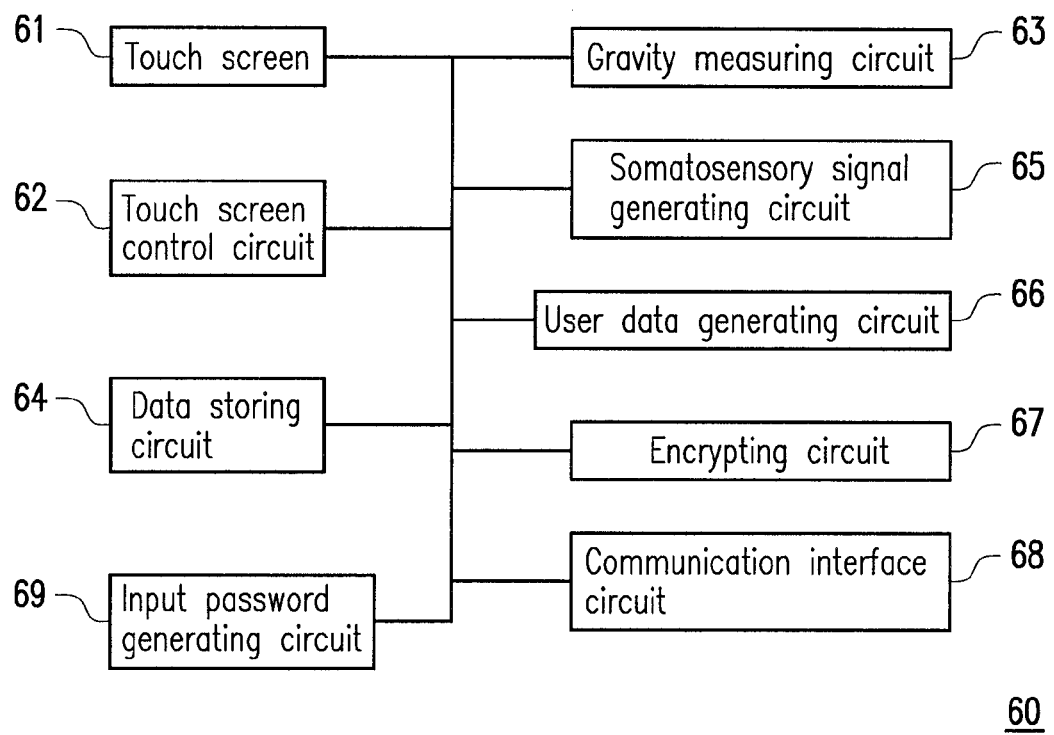
FIG. 6 is a schematic block diagram illustrating a portable electronic device according to a third exemplary embodiment of the present invention.

FIG. 6 is a schematic block diagram illustrating a portable electronic device according to a third exemplary embodiment of the present invention.

Referring to FIG. 6, the portable electronic device 60 includes a touch screen 61, a touch screen control circuit 62, a gravity measuring circuit 63, a data storing circuit 64, a somatosensory signal generating circuit 65, an encrypting circuit 67 a communication interface circuit 68 and an input password generating circuit 69.

In the third exemplary embodiment, the touch screen 61, the touch screen control circuit 62, the data storing circuit 64, the somatosensory signal generating circuit 65, the user password data generating circuit 66, the encrypting circuit 67 and the communication interface circuit 68 are respectively identical to the touch screen 11, the touch screen control circuit 12, the gravity measuring circuit 13, the data storing circuit 14, the somatosensory signal generating circuit 15, the encrypting circuit 17 and the communication interface circuit of FIG. 2. Therefore, only the user password data generating circuit 66 and the input password generating circuit 69 are described in detail hereinafter.

The input password generating circuit 69 is coupled to the touch screen control circuit 62 and the user password data generating circuit 66 and configured to generate a corresponding input password set according to the touch signal on the touch screen 11.

The user password data generating circuit 66 is coupled to the somatosensory signal generating circuit 65 and configured to generate a user password data according to the somatosensory signal data set generated by the somatosensory signal generating circuit 69.

Figure 7:
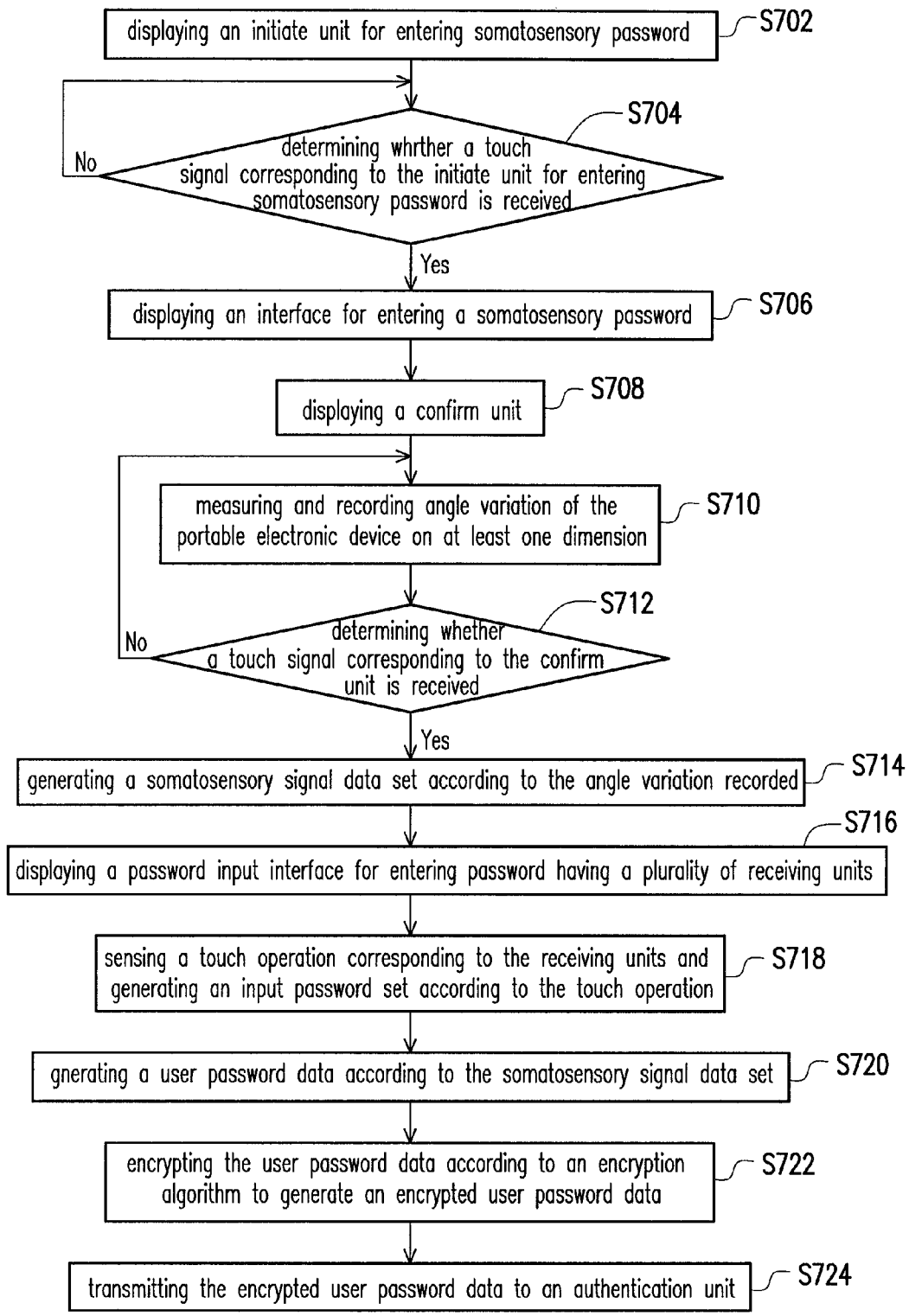
FIG. 7 is a flowchart illustrating a method of entering password according to the third exemplary embodiment of the present invention.

FIG. 7 is a flowchart illustrating a method of entering password according to the third exemplary embodiment of the present invention.

Referring to FIG. 7, in step S702, the touch screen control circuit 62 controls the touch screen 61 to display the initiate unit for entering somatosensory password. In step S704, the touch screen control circuit 62 determines whether a touch signal corresponding to the initiate unit for entering somatosensory password is received.

Step S704 may be repeated by the touch screen control circuit 62 if the touch signal corresponding to the initiate unit for entering somatosensory password is not received by the touch screen control circuit 62.

If the touch signal corresponding to the initiate unit for entering somatosensory password is received by the touch screen control circuit 62, the touch screen control circuit 62 controls the touch screen 61 to display the initiate unit for entering somatosensory password in step S706.

In step S708, the touch screen control circuit 62 controls the touch screen 61 to display the confirm unit.

Next, in step S710, the gravity measuring circuit 63 may start measuring the angle variation of the portable electronic device 60 on one or more dimensions, and converting the measured angle variation and a count thereof to the angle variation data and recording the angle variation data to the data storing circuit 64. In step S712, the touch screen control circuit 62 determines whether a touch signal corresponding to the confirm unit is received. Step S710 and step S712 may be repeated by the touch screen control circuit 62 if the touch signal corresponding to the confirm unit is not received by the touch screen control circuit 62.

If the touch signal corresponding to the confirm unit is received by the touch screen control circuit 62, the somatosensory signal generating circuit 65 generates the somatosensory signal data set according to the angle variation on one more dimensions and the number of times of the angle variation of the portable electronic device 60 in step S714. In step S716, the touch screen control circuit 62 controls the touch screen 61 to display a password input interface for entering password having a plurality of receiving units. For example, in the present exemplary embodiment, the touch screen control circuit 62 may control the touch screen 61 to arrange and display the receiving units according to a clock pattern, in which the receiving units correspond to a plurality of symbols and the symbols include a plurality of numeral symbols, a confirm symbol and a cancel symbol.

Figure 8:
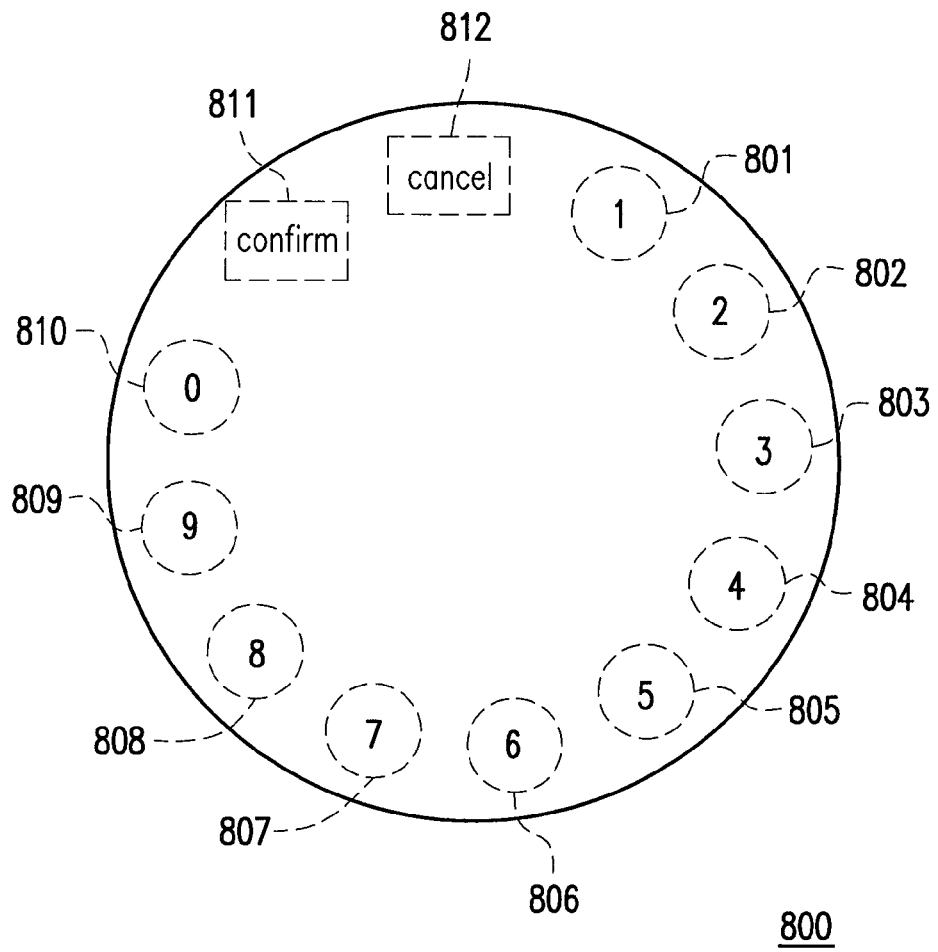
FIG. 8 is a schematic diagram illustrating a password input interface for entering password according to the third exemplary embodiment of the present invention.

FIG. 8 is a schematic diagram illustrating a password input interface for entering password according to the third exemplary embodiment of the present invention.

Referring to FIG. 8, the touch screen control circuit 62 controls the touch screen 61 to display a password input interface for entering password 800, in which the password input interface for entering password 800 arranges and displays the receiving units 801 to 802 according to a clock pattern. In addition, the receiving unit 801 to 810 is configured to display numeral symbols 0 to 9, and the receiving unit 811 and 812 are respectively configured to display a confirm symbol and a cancel symbol.

Referring back to FIG. 7, in step S718, the touch screen control circuit 62 senses a touch operation corresponding to the receiving units on the touch screen 61 and the input password generating circuit 69 generates an input password set according to the touch operation. It is exemplified with the password input interface for entering password 800 of FIG. 8, if the user successively clicks the receiving unit 801 (corresponding to numeral symbol 1), the receiving unit 803 (corresponding to numeral symbol 3), the receiving unit 805 (corresponding to numeral symbol 5) and the receiving unit 811 (corresponding to numeral symbol), the input password generating circuit 69 may generate an input password set with a numeral combination of "135".

Next, in step S720, the user password data generating circuit 66 generates the user password data according to the somatosensory signal data set and the input password set. For example, after obtaining the somatosensory signal data set and the input password set, the user password data generating circuit 66 may compose the somatosensory signal data set and the input password set in a preset order to generate the user password data.

Figure 9:
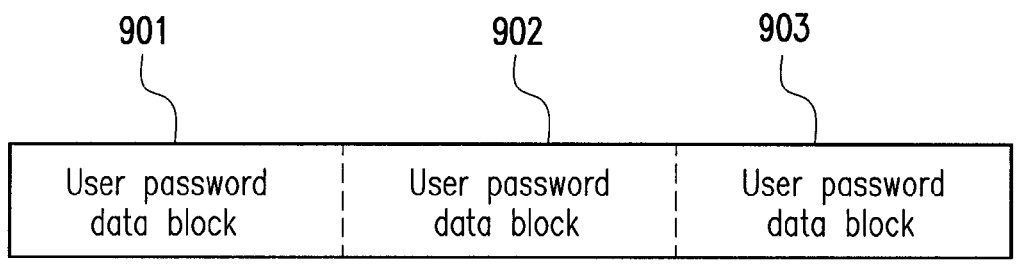
FIG. 9 is a schematic diagram illustrating a user password data according to the third exemplary embodiment of the present invention.

FIG. 9 is a schematic diagram illustrating a user password data according to the third exemplary embodiment of the present invention.

Referring to FIG. 9, the user password data generating circuit 66 may divide the user password data into three user password data blocks 901 to 903. In which, the user password data block 901 and the user password data block 903 are used to fill with the somatosensory signal data set, whereas the user password data block 901 are used to fill with the input password set. In particular, the user password data generating circuit 66 generates the user password data according to the preset order of the somatosensory signal data set and the input password set received in the present exemplary embodiment.

For example, if the user password data generating circuit 66 has received a first somatosensory signal data set, the user password data generating circuit 66 fills the first somatosensory signal data set into the user password data block 901. Next, if the user password data generating circuit 66 has received an input password set, the user password data generating circuit 66 fills the input password set into the user password data block 902. Lastly, if the user password data generating circuit 66 has received a second somatosensory signal data set, the user password data generating circuit 66 fills the second somatosensory signal data set into the user password data block 903, thereby generating a complete set of user password data.

However, it should be noted that, the order and number of times of the somatosensory signal data set and the input password set received are not particularly limited in the present invention. In other words, the order and the number of times regarding related steps for measuring the angle variation of the portable electronic device (e.g., the step S710) and related steps for generating the input password set according to the touch operation (e.g., the steps S716 and S718) in the flowchart of FIG. 7 may be properly adjusted according to practical uses or design requirement.

Referring to FIG. 7, in step S722, the encrypting circuit 67 encrypts the user password data according to an encryption algorithm to generate an encrypted user password data. Lastly, in step S724, the communication interface circuit 68 transmits the encrypted user password data to the authentication unit 100.

Fourth Exemplary Embodiment

The hardware structure of the fourth exemplary embodiment is substantially the same to the hardware structure used in the third exemplary embodiment, their difference lies where: In the fourth exemplary embodiment, the keyboard for entering the password are represented in a form of poker cards, thereby enhancing the pleasure for the user while entering the password.

For example, in the present exemplary embodiment the touch screen control circuit 62 controls the touch screen 61 to display a plurality of poker cards in a facing-down fashion (i.e., folded), in which the receiving units are arranged on the poker cards. Next, the touch screen control circuit 62 senses a touch operation of the user to the receiving units on the touch screen 61 and displays a portion of the poker cards (i.e., the poker cards being touched by the user) in a facing-up fashion (i.e., unfolded). Further, each of the unfolded poker cards may randomly displays one of a plurality of symbols, in which the symbols includes a plurality of numeral symbols such as numeral symbols 0 to 9. In addition, the unfolded poker cards may display various colors or portraits, the invention is not limited thereto.

Figure 10:
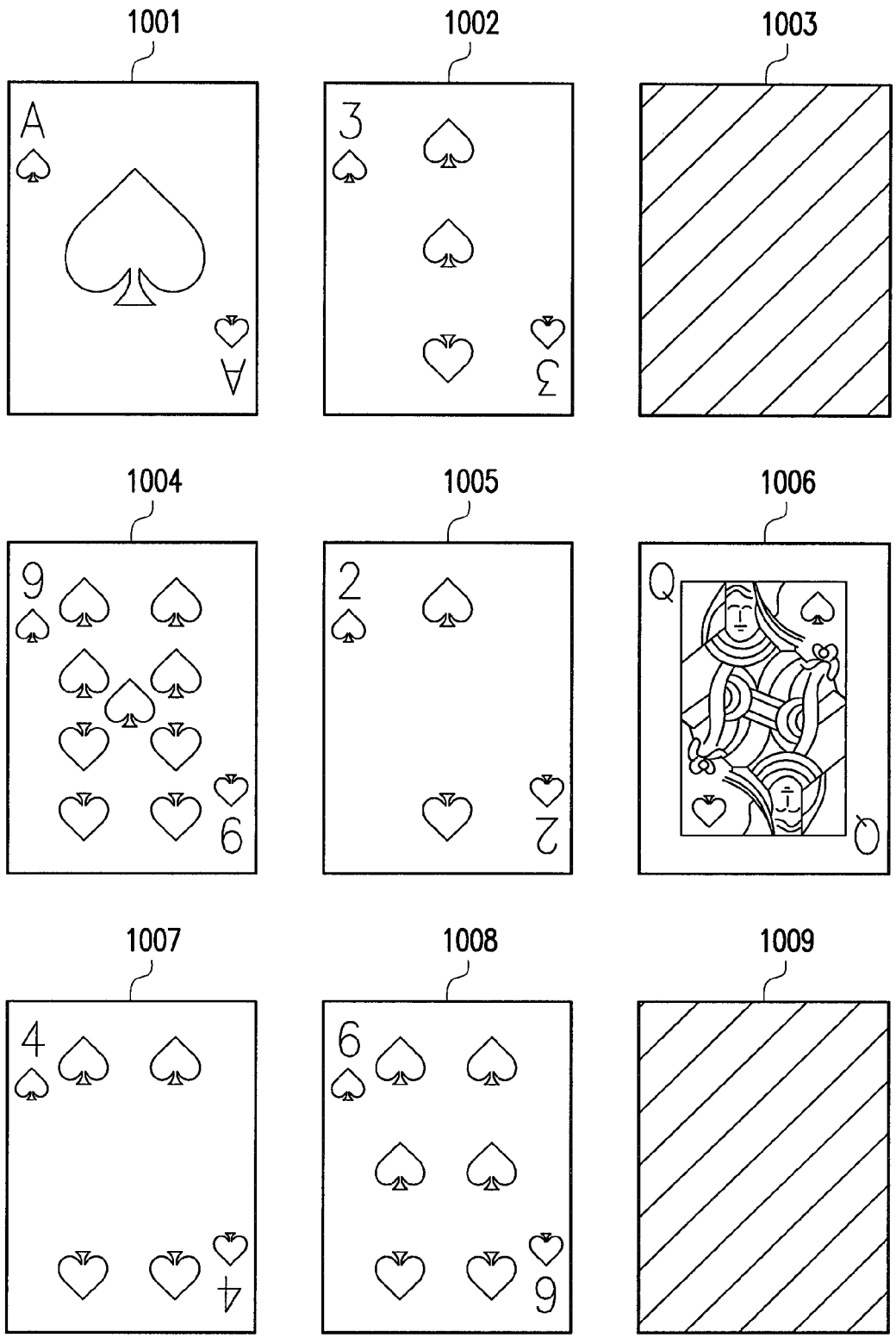
FIG. 10 is a schematic diagram illustrating a password input interface for entering password according to a fourth exemplary embodiment of the present invention.

FIG. 10 is a schematic diagram illustrating a password input interface for entering password according to a fourth exemplary embodiment of the present invention.

Referring to FIG. 10, a password input interface for entering password 1000 includes receiving units 1000 to 1009. It is assumed that the user has successively clicked the receiving unit 1001, the receiving unit 1002, the receiving unit 1004, the receiving unit 1005, the receiving unit 1007 and the receiving unit 1008, in this case, the input password generating circuit 69 may generate an input password set with a combination of "139246", accordingly. In addition, in the case where the symbol displayed after the receiving unit (i.e., the poker card) being clicked by the user is not a numeral symbol (e.g., the receiving unit 1006), or the numeral symbol after unfolding is not what the user desired, the user may click said poker card once again to fold it, and click said folded poker card once again to obtain a random symbol until a symbol that the user desired has been displayed.

Fifth Exemplary Embodiment

The hardware structure of the fifth exemplary embodiment is substantially the same to the hardware structure used in the third exemplary embodiment, their difference lies where: In the fifth exemplary embodiment, the keyboard for entering the password are represented in a form of an abacus.

For example, in the present exemplary embodiment, the touch screen control circuit 62 controls the touch screen 61 to arrange and display the receiving units according to an abacus pattern and a plurality of count beads, in which the count beads arranged on an upper portion of the abacus pattern respectively represent a first number (e.g., 5), and the count beads arranged on a lower portion of the abacus pattern respectively represent a second number (e.g., 1).

Figure 11:
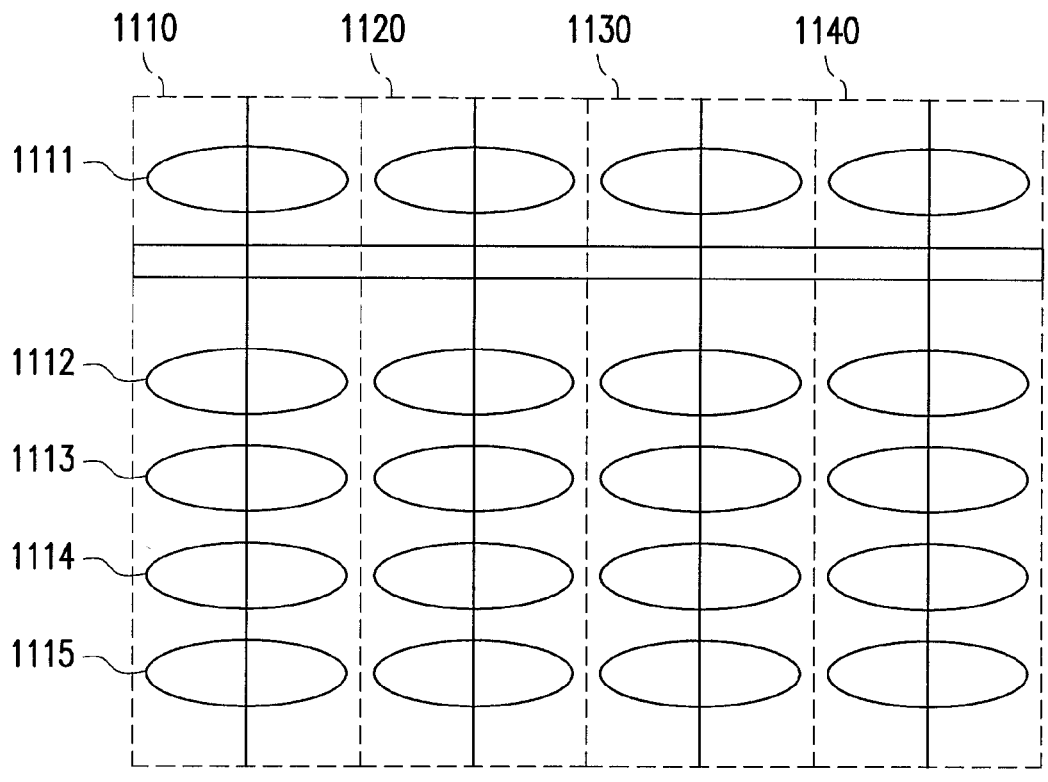
FIG. 11 is a schematic diagram illustrating a password input interface for entering password according to a fifth exemplary embodiment of the present invention.

FIG. 11 is a schematic diagram illustrating a password input interface for entering password according to a fifth exemplary embodiment of the present invention.

Referring to FIG. 11, a password input interface for entering password 1100 includes count beads strings 1110 to 1140. In which, each of the count beads strings includes receiving units which are in a form of count beads. For example, the count beads string 1110 includes the receiving unit 1111 to 1115 in a form of the count beads, and the rest of the count beads strings are also in the same form of the count beads. In the present exemplary embodiment, the count beads strings 1110 to 1140 are used to respectively generate a first number to the fourth number of the input password set. In which, the count beads on the upper portion (e.g., the count bead 1111) represent the number "5", and the count beads on the lower portion (e.g., the count beads 1112 to 1115) represent the number "1". For example, if the user intended to use the number "7" as the first number of the input password set, the user may click the count bead 1111 (i.e., the number "5"), the count bead 1112 (i.e., the number "1") and the count bead 1113 (i.e., the number "1"). In this case, the input password generating circuit 69 is notified to generate the number "7" (i.e., 5+1+1=7), which is the first number of the input password set, the second number to the fourth number of the input password set may be generated with the same method, so it is omitted herein.

Sixth Exemplary Embodiment

The hardware structure of the sixth exemplary embodiment is substantially the same to the hardware structure used in the third exemplary embodiment, their difference lies where: In the sixth exemplary embodiment, the keyboard for entering the password are represented in a form of a plurality of geometric figures (similar to the same "Hopscotch").

For example, in the present exemplary embodiment, the touch screen control circuit 62 control the touch screen 61 to arrange and display a plurality of blocks and arrange a plurality of receiving units to the blocks, in which the receiving units correspond to a plurality of symbols and the symbols include a plurality of numeral symbols, a confirm symbol and a cancel symbol.

Figure 12:
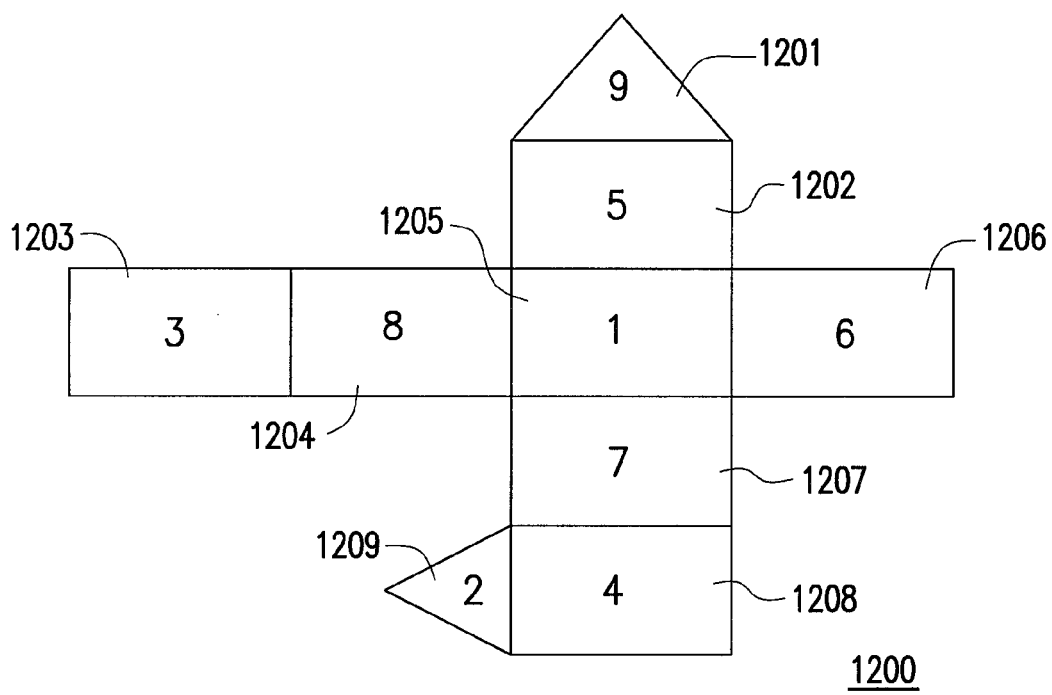
FIG. 12 is a schematic diagram illustrating a password input interface for entering password according to a sixth exemplary embodiment of the present invention.

FIG. 12 is a schematic diagram illustrating a password input interface for entering password according to a sixth exemplary embodiment of the present invention.

Referring to FIG. 12, the password input interface for entering password 1200 includes receiving units 1201 to 1209 in a form of geometric figures. In which, the receiving units 1201 to 1209 respectively represent numeral symbols 0 to 9. For example, the receiving unit 1201 represents the numeral symbols 9, the receiving unit 1202 represents the numeral symbols 5 and so on, as shown in FIG. 12. It is assumed that the user has successively clicked the receiving unit 1201, the receiving unit 1204 and the receiving unit 1207, the input password generating circuit 69 may generate an input password set with a combination of "987", accordingly. In addition, the receiving units 1201 to 1209 may respectively represent English characters or other special symbols, the invention is not limited thereto.

Seventh Exemplary Embodiment

The seventh exemplary embodiment provides an unlocking method based on the concept of the exemplary embodiments said above and the hardware structure thereof is similar to the hardware structure used in the first exemplary embodiment, their difference lies where: The portable electronic device in the present exemplary embodiment further includes a locking circuit and an unlocking circuit, in which the locking circuit may switch an unlocking state of the touch screen of the portable electronic device into a locking state, whereas the unlocking circuit may switch the locking state of the touch screen of the portable electronic device into the unlocking state. Base on above, for the portable electronic device that require password protection, the unlocking method provided by the present exemplary embodiment may substantially reduce the risk of an unlocking password (i.e., the user password data) being skimmed.

Figure 13:
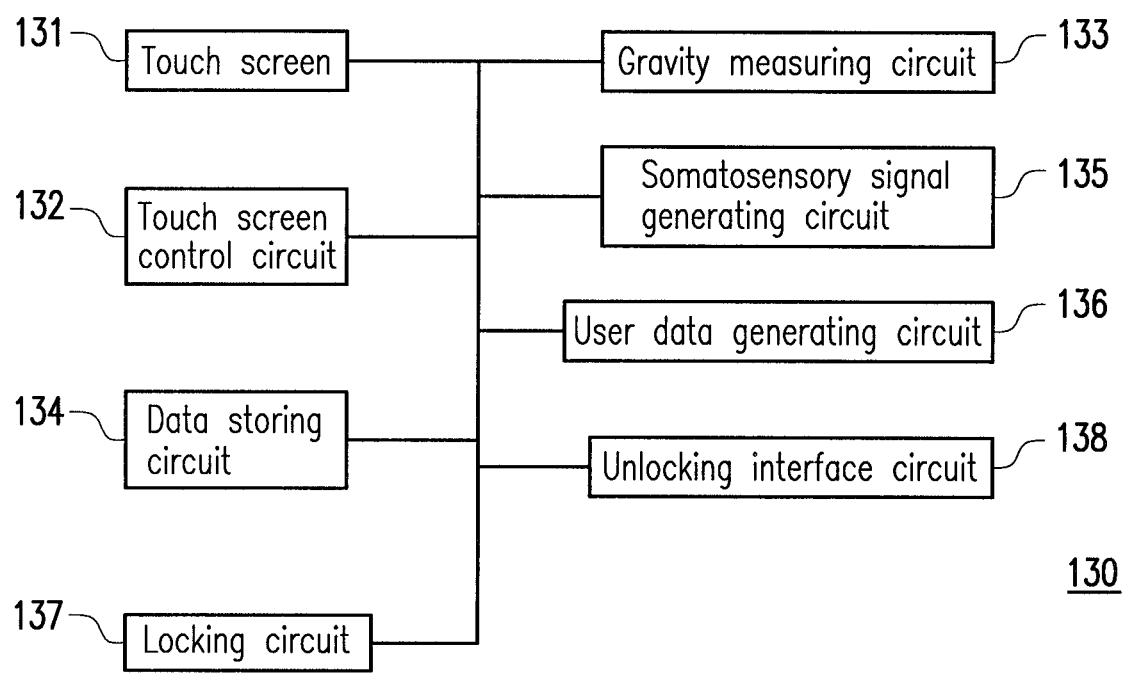
FIG. 13 is a schematic block diagram illustrating a portable electronic device according to a seventh exemplary embodiment of the present invention.

FIG. 13 is a schematic block diagram illustrating a portable electronic device according to a seventh exemplary embodiment of the present invention.

Referring to FIG. 13, the portable electronic device 130 includes a touch screen 131, a touch screen control circuit 132, a gravity measuring circuit 133, a data storing circuit 134, a somatosensory signal generating circuit 135, a user password data generating circuit 136, an locking circuit 137 and an unlocking circuit 138.

In the seventh exemplary embodiment, the touch screen 131, the touch screen control circuit 132, the gravity measuring circuit 133, the data storing circuit 134, the somatosensory signal generating circuit 135 and the user password data generating circuit 136 are respectively identical to the touch screen 11, the touch screen control circuit 12, the gravity measuring circuit 13, the data storing circuit 14, the somatosensory signal generating circuit 15 and the user password data generating circuit 16 in the first exemplary embodiment, so it is omitted herein.

The locking circuit 137 is coupled to a preset functional module of the touch screen 131 and configured to switch the touch screen 131 into a locking state. Under the locking state, the touch screen 131 may only display a specific image, for example, an unlocking interface. In the present exemplary embodiment, the preset functional module may be, for example, a non-password identifying module, a touch signal receiving module and a communication module.

The unlocking circuit 138 is coupled to the touch screen 131 and the user password data generating circuit 136 and configured for comparing the user password data with a preset content, thereby determining whether to switch the touch screen 131 of the portable electronic device 130 into the unlocking state.

Figure 14:
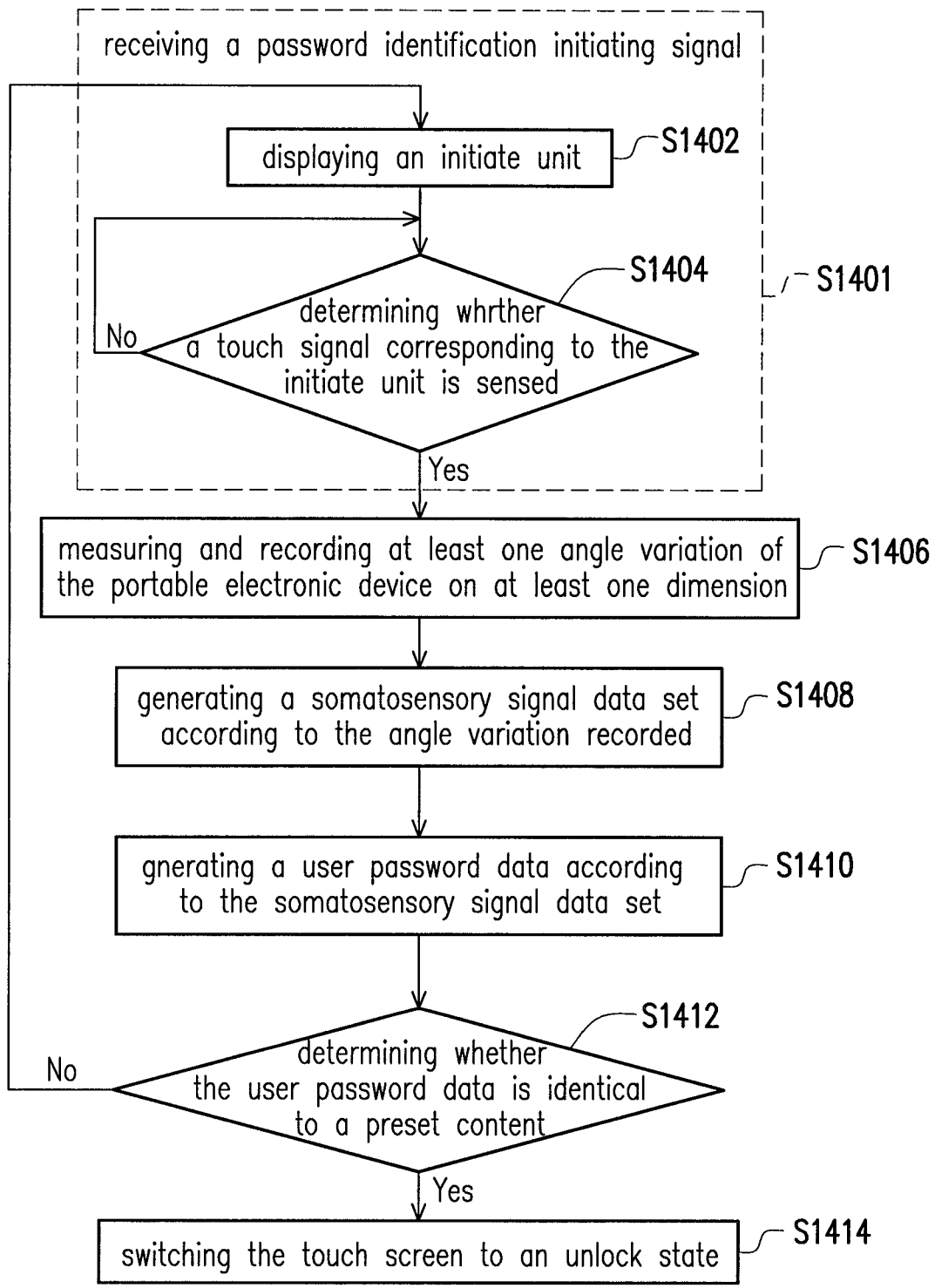
FIG. 14 is a flowchart illustrating an unlocking method according to the seventh exemplary embodiment of the present invention.

FIG. 14 is a flowchart illustrating an unlocking method according to the seventh exemplary embodiment of the present invention.

Referring to FIG. 14, it is assumed that the unlocking circuit 137 has tuned the touch screen 131 into the locking state. In step S1401, the touch screen control circuit 132 receives a password identification initiating signal, in which the password identification initiating signal may be generated by a hardware switch, a initiate unit of the touch screen or dragging a specific track on the touch screen with a finger, the method of generating the password identification initiating signal is not particularly limited in the present invention.

For example, referring to the initiate unit on the touch screen 131, in step S1402, the touch screen control circuit 132 may control the touch screen to display the initiate unit.

Next, in step S1404, the touch screen control circuit 132 determines whether a touch signal corresponding to the confirm unit is sensed.

Step S1404 may be repeated by the touch screen control circuit 132 if the touch signal corresponding to the initiate unit is not sensed by the touch screen control circuit 132.

A message indicating that the password identification initiating signal has been sensed is displayed if the touch signal corresponding to the initiate unit is sensed by the touch screen control circuit 132.

After receiving the password identification initiating signal, in step S1406, the gravity measuring circuit 133 may measure one or more angle variations of the portable electronic device 130 on one or more dimensions and records the angle variation of the portable electronic device 130 on one or more dimensions to the data storing circuit 134.

Next, in step S1408, the somatosensory signal generating circuit 135 generates a somatosensory signal data set according to the angle variation of the portable electronic device 130 on one or more dimensions.

Next, in step S1410, the user password data generating circuit 136 generates the user password data according to the somatosensory signal data set. In step S1412, the unlocking circuit 138 determines whether the user password data is identical to a preset content.

The unlocking circuit 138 switches the touch screen 131 to an unlock state if the user password data is identical to the preset content. For example, the unlocking circuit 138 may determine whether data of the user password data is identical to a preset data. The touch screen 131 may be unlocked if the said determination is positive. In addition, step S1402 may be repeated by the touch screen 131 if the unlocking circuit 138 has determined that the user password data is not identical to the preset content.

Eighth Exemplary Embodiment

The hardware structure of the eighth exemplary embodiment is similar to the hardware structure used in the seventh exemplary embodiment, their difference lies where: In the present exemplary embodiment, after entering the somatosensory password, the user may click a confirm unit to notify the portable electronic device to start generating the somatosensory signal data set according to the angle variation by clicking a confirm unit. Based on above, the portable electronic device may clearly identify the starting point and the end point for detecting the somatosensory password, frequency of misjudgment may be reduced accordingly.

Figure 15:
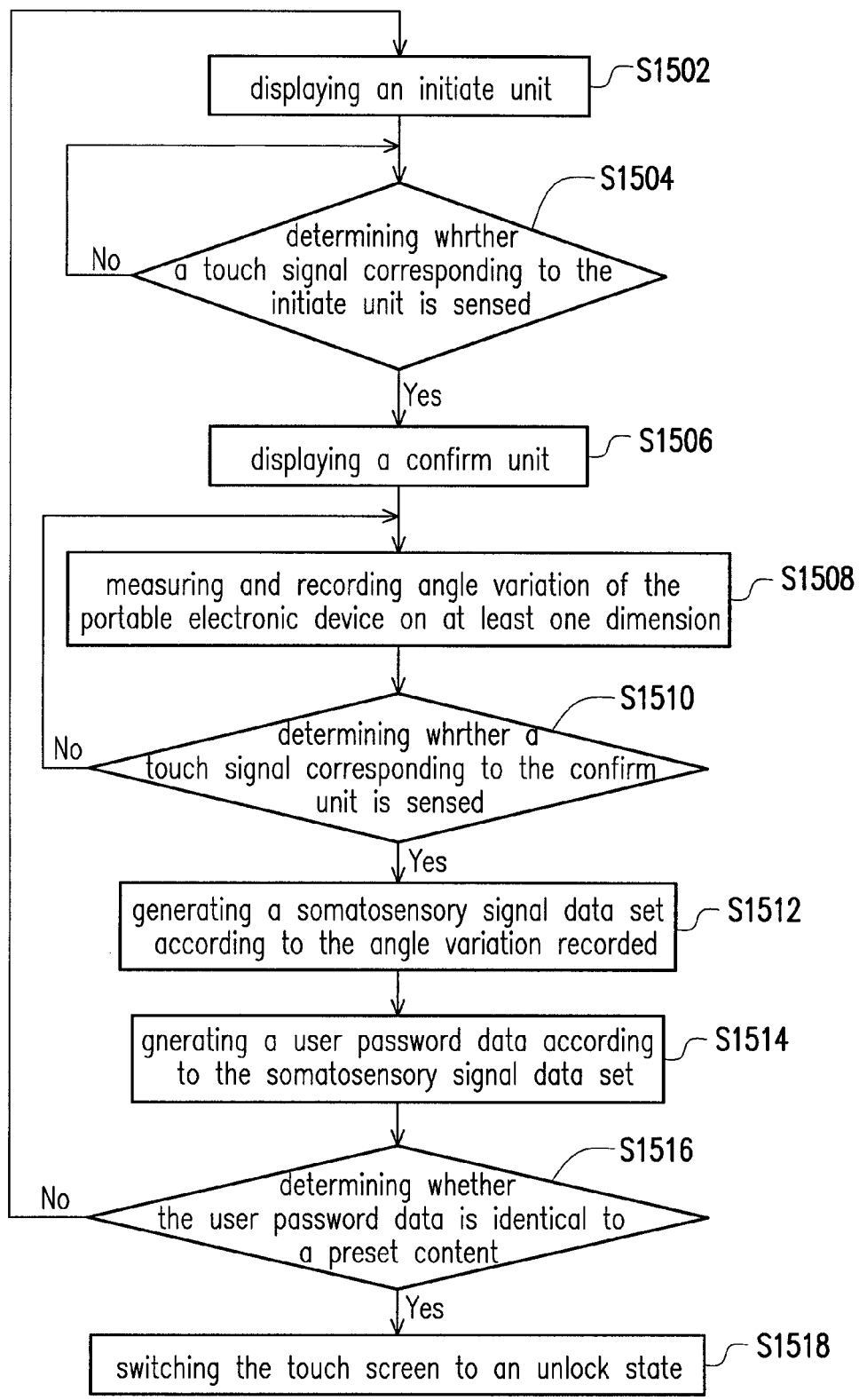
FIG. 15 is a flowchart illustrating an unlocking method according to an eighth exemplary embodiment of the present invention.

FIG. 15 is a flowchart illustrating an unlocking method according to an eighth exemplary embodiment of the present invention.

Referring to FIG. 15, it is assumed that the locking circuit 137 has switched the touch screen 131 into the locking state. In step S1502, the touch screen control circuit 132 controls the touch screen 131 to display an initiate unit.

Next, in step S1504, the touch screen control circuit 132 determines whether a touch signal corresponding to the confirm unit is sensed.

Step S1504 may be repeated by the touch screen control circuit 132 if the touch signal corresponding to the initiate unit is not sensed by the touch screen control circuit 132.

If the touch signal corresponding to the initiate unit is sensed by the touch screen control circuit 132, the touch screen control circuit 132 controls the touch screen 131 to display the confirm unit in step S1506. It should be noted that step S1502 and step S1504 are only one of the methods for receiving the password identification initiating signal. In step S1401, the methods for receiving the password identification initiating signal may also include generating the password identification initiating signal by a hardware switch or dragging a specific track on the touch screen with a finger, the invention is not limited thereto.

Next, in step S1508, the gravity measuring circuit 133 may measure one or more angle variations of the portable electronic device 130 on one or more dimensions and records the angle variation of the portable electronic device 130 on one or more dimensions to the data storing circuit 134.

In step S1510, the touch screen control circuit 132 determines whether a touch signal corresponding to the confirm unit is received.

Step S1508 may be repeated by the gravity measuring circuit 133 if the touch screen control circuit 132 has determined that the touch signal corresponding to the confirm unit is not received.

If the touch signal corresponding to the confirm unit is received by the touch screen control circuit 132, the somatosensory signal generating circuit 135 generates the somatosensory signal data set according to the angle variation on one or more dimensions of the portable electronic device 130 in step S1512.

Next, in step S1514, the user password data generating circuit 136 generates the user password data according to the somatosensory signal data set. For example, the user password data generating circuit 136 may generate the user password data according to only the somatosensory signal data set in the present exemplary embodiment. For example, in step S516, after obtaining the somatosensory signal data set, the user password data generating circuit 136 may compose data corresponding to the touch signal of the initiate unit for entering somatosensory password, the somatosensory signal data set and the data corresponding to the touch signal of the confirm unit in a preset order to generate the user password data.

In step S1516, the unlocking circuit 138 determines whether the user password data is identical to a preset content.

If the user password data is identical to the preset content, in step S1518, the unlocking circuit 138 switches the touch screen 131 to an unlock state. For example, the unlocking circuit 138 may determine whether data of the user password data is identical to a preset data. The touch screen 131 may be unlocked if the said determination is positive. In addition, step S1502 may be repeated by the touch screen 131 if the unlocking circuit 138 has determined that the user password data is not identical to the preset content.

Ninth Exemplary Embodiment

The ninth exemplary embodiment provides a data authenticating method based on the concept of the exemplary embodiments said above and the hardware structure thereof is similar to the hardware structure used in the first exemplary embodiment, their difference lies where: The portable electronic device in the present exemplary embodiment further includes a locking circuit and an unlocking circuit 168, the portable electronic device may transmit the user password data to an authentication unit for verification to determine whether to permit a predetermined functional module (hereinafter, the portable electronic device) to execute. Based on above, the portable electronic device may respectively perform an access control to different preset function module in a flexible manner.

Figure 16:
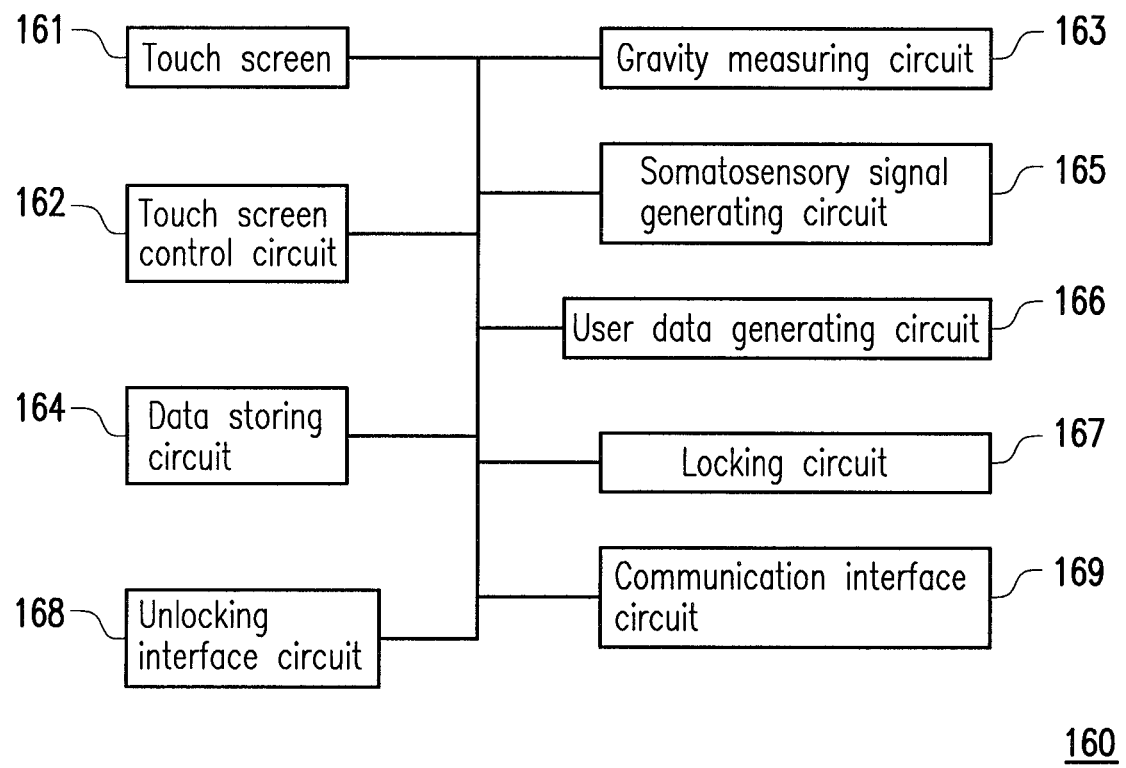
FIG. 16 is a schematic block diagram illustrating a portable electronic device according to a ninth exemplary embodiment of the present invention.

FIG. 16 is a schematic block diagram illustrating a portable electronic device according to a ninth exemplary embodiment of the present invention.

Referring to FIG. 16, the portable electronic device 160 includes a touch screen 161, a touch screen control circuit 162, a gravity measuring circuit 166, a data storing circuit 164, a somatosensory signal generating circuit 165, a user password data generating circuit 166 and a communication interface circuit 169.

In the ninth exemplary embodiment, the touch screen 161, the touch screen control circuit 162, the gravity measuring circuit 166, the data storing circuit 164, the somatosensory signal generating circuit 165, the user password data generating circuit 166 and the user password data generating circuit 169 are respectively identical to the touch screen 11, the touch screen control circuit 12, the gravity measuring circuit 16, the data storing circuit 14, the somatosensory signal generating circuit 15 and the user password data generating circuit 16 and the communication interface circuit 18 in the first exemplary embodiment, so it is omitted herein.

The locking circuit 167 is configured to lock a preset functional module, in which the preset functional module may be software program modules or hardware circuits having specific functions, such as a non-password identifying module, a communication module, a network module, a file transmitting module or a text editing module. In addition, the preset functional module locked may not be executed.

The unlocking circuit 168 is coupled to the communication interface circuit 169 and configured for unlocking the preset functional module being locked. In particular, after receiving a permit message transmitted from the authentication unit (e.g., the authentication unit 100 of FIG. 1), the unlocking circuit 168 may unlock the corresponding preset functional module.

Figure 17:
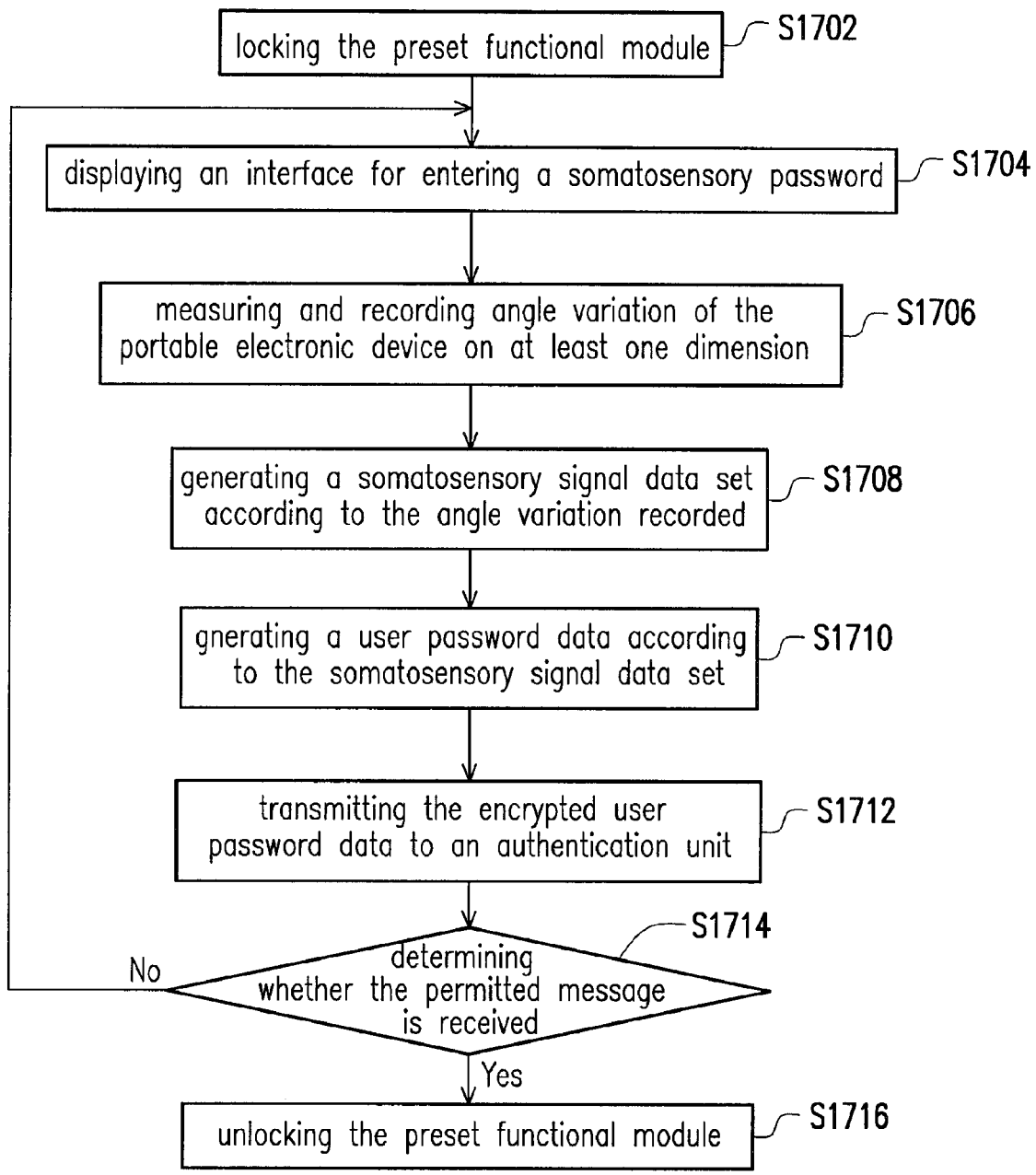
FIG. 17 is a flowchart illustrating a data authenticating method according to the ninth exemplary embodiment of the present invention.

FIG. 17 is a flowchart illustrating a data authenticating method according to the ninth exemplary embodiment of the present invention.

Referring to FIG. 17, in step S1702, the preset functional module is locked by the locking module 167.

Next, in step S1704, the touch screen control circuit 162 controls the touch screen 161 to display an interface for entering somatosensory password. Further, in step S1706, the gravity measuring circuit 166 may measure one or more angle variations of the portable electronic device 160 on one or more dimensions and records the angle variation of the portable electronic device 160 on one or more dimensions to the data storing circuit 164.

Next, in step S1708, the somatosensory signal generating circuit 165 generates a somatosensory signal data set according to the angle variation of the portable electronic device 160 on one or more dimensions.

Next, in step S1710, the user password data generating circuit 166 generates the user password data according to the somatosensory signal data set. In step S1712, the communication interface circuit 169 transmits the encrypted user password data to the authentication unit (e.g., the authentication unit 100 of FIG. 1). For example, the authentication unit may have an authentication code, so that the authentication unit may perform a verification to a user identification of the portable electronic device 160 according the authentication code and the user password data obtained, and permits the preset functional module locked in the portable electronic device 160 for executing by sending a permitted message after the user identification has been verified.

It should be noted that, the authentication unit may be a software authentication process or a hardware authentication circuit within the portable electronic device 160, or a remote authentication server, the invention is not limited thereto. For example, in step S1712, the user password data generating circuit 166 directly transmits the user password data to the hardware authentication circuit of the portable electronic device 160 to verify the user identification. In addition, the user password data may be encrypted before transmitting to the remote authentication unit, so as to prevent it from being captured during the transmitting process.

In step S1714, the unlocking circuit 168 determines whether the permitted message is received, for example, through the communication interface circuit 169. If the permitted message transmitted from the authentication unit is received by the unlocking circuit 168, in step S1716, the unlocking circuit 168 may unlock the corresponding preset functional module to permit the preset functional module to be executed. Based on above, the user may operate the corresponding functions of the preset functional module, such as suffering on the text editing.

In addition, in step S1714, if the permitted message transmitted from the authentication unit is not received by the unlocking circuit 168 within a range of time period (e.g., 2 seconds), step S1704 is then repeated by the touch screen 161.

It should be noted that, the touch screen control circuit, the gravity measuring circuit, the data storing circuit, the somatosensory signal generating circuit, the user password data generating circuit, the encrypting circuit, the communication interface circuit, the locking circuit and the unlocking circuit as mentioned in the exemplary embodiments may be, for example, hardware device composed by logical circuit elements to respectively perform the functions as mentioned above. In addition, the circuits may be stored in the hard drive the portable electronic device or software programs or firmware programs stored in the memory. For example, in an exemplary embodiment, software programs or firmware programs for implementing above functions may be loaded to the processor of the portable electronic device to respectively perform the function as mentioned above.

Based on above, the method for entering password and the portable electronic device using the same provided by the exemplary embodiments of the invention generates the somatosensory signal data set by measuring at least one angle variation on at least one dimension of the portable electronic device, and generating the user password data by using the user password data. Next, the user password data is encrypted and transmitted to an authentication unit to verify the user identification. In addition, the unlocking method provided by the exemplary embodiments of the present invention, in which the touch screen is switched to an unlock state if the user password data is identical to the preset content. Further, the data authenticating method provided by the exemplary embodiments of the invention may verify the current user identification of the portable electronic device by using the user password data, thereby determining whether to permit the corresponding function to be executed. Based on above, for the portable electronic device that require password protection, the unlocking method provided by the present exemplary embodiment may substantially reduce the risk of an unlocking password (i.e., the user password data) being skimmed. The previously described exemplary embodiments of the present invention have the advantages aforementioned, wherein the advantages aforementioned not required in all versions of the invention.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed:

1. A method of entering password, for a portable electronic device, wherein the portable electronic device has a touch screen, the method of entering password comprising:
    displaying an interface for entering somatosensory password;
    measuring an angle variation of the portable electronic device;
    recording the measured angle variation of the portable electronic device if the measured angle variation exceeds a predetermined threshold and updating a count value corresponding to a total number of the recorded angle variation of the portable electronic device on at least one dimension;
    generating a somatosensory signal data set according to the recorded angle variation of the portable electronic device and the updated count value;
    generating a user password data according to the somatosensory signal data set;
    encrypting the user password data according to an encryption algorithm to generate an encrypted user password data;
    transmitting the encrypted user password data to an authentication unit, wherein the authentication unit decrypts the encrypted user password data according a decryption algorithm to obtain the user password data, and verifies a user identification of the portable electronic device according to the user password data obtained;
    wherein the steps of updating the count value and generating the somatosensory signal data set comprises:
        updating a count value corresponding to a total number of the recorded angle variation of the portable electronic device on each of the at least one dimension; and
        generating the somatosensory signal data set according to the recorded angle variation of the portable electronic device on each of the at least one dimension and the updated count value corresponding to the total number of the recorded angle variation of the portable electronic device on each of the at least one dimension.

2. The method of entering password as claimed in claim 1, the steps of measuring the angle variation of the portable electronic device, recording the measured angle variation, and generating the somatosensory signal data set comprises:
    measuring a first included angle of a body of the portable electronic device between a first orientation and a horizontal line;
    determining whether the first included angle is larger than a first threshold value;
    adding a first message to the somatosensory signal data set if the first included angle is larger than the first threshold value;
    determining whether the first included angle is smaller than a second threshold value; and
    adding a second message to the somatosensory signal data set if the first included angle is smaller than the second threshold value.

3. The method of entering password as claimed in claim 2, the steps of measuring the angle variation of the portable electronic device, recording the measured angle variation, and generating the somatosensory signal data set further comprises:
    measuring a second included angle of the body of the portable electronic device between a second orientation and the horizontal line, wherein the first orientation is vertical to the second orientation;
    determining whether the second included angle is larger than a third threshold value;
    adding a third message to the somatosensory signal data set if the second included angle is larger than the third threshold value;
    determining whether the second included angle is smaller than a fourth threshold value; and
    adding a fourth message to the somatosensory signal data set if the second included angle is smaller than the fourth threshold value.

4. The method of entering password as claimed in claim 3, the steps of measuring the angle variation of the portable electronic device, recording the measured angle variation, and generating the somatosensory signal data set further comprises:
    measuring a third included angle between the body of the portable electronic device and a third orientation;
    determining whether the third included angle is larger than a fifth threshold value;
    adding a fifth message to the somatosensory signal data set if the third included angle is larger than the fifth threshold value;
    determining whether the third included angle is smaller than a sixth threshold value; and
    adding a sixth message to the somatosensory signal data set if the third included angle is smaller than the sixth threshold value.

5. The method of entering password as claimed in claim 1, further comprising:
- displaying an initiate unit for entering somatosensory password on the touch screen;
- determining whether a touch signal corresponding to the initiate unit for entering somatosensory password is received; and
- displaying the interface for entering somatosensory password if the touch signal corresponding to the initiate unit for entering somatosensory password is received.

6. The method of entering password as claimed in claim 1, further comprising:
- displaying a confirm unit on the touch screen; and
- determining whether a touch signal corresponding to the confirm unit is received,
- wherein the step of generating the somatosensory signal data set is performed after the touch signal corresponding to the confirm unit is received.

7. The method of entering password as claimed in claim 1, further comprising:
- displaying a password input interface for entering password having a plurality of receiving units on the touch screen; and
- sensing a touch operation corresponding to a portion of the receiving units on the touch screen, and generating an input password set according to the touch operation,
- wherein the step of generating the user password data according to the somatosensory signal data set comprises generating the user password data according to the somatosensory signal data set and the input password set.

8. The method of entering password as claimed in claim 7, wherein the step of displaying the password input interface for entering password on the touch screen comprises:
- arranging and displaying the receiving units according to a clock pattern, wherein the receiving units correspond to a plurality of symbols and the symbols comprise a plurality of numeral symbol, a confirm symbol and a cancel symbol.

9. The method of entering password as claimed in claim 7, wherein the step of displaying the password input interface for entering password on the touch screen comprises:
- displaying a plurality of poker cards in a facing-down fashion on the touch screen, wherein the receiving units are arranged on the poker cards; and
- displaying at least a portion of the poker cards in a facing-up fashion on the touch screen based on the touch operation, wherein each of the portion of the poker cards in the facing-up fashion randomly displays one of a plurality of symbols, and the symbols comprise a plurality of numeral symbols.

10. The method of entering password as claimed in claim 7, wherein the step of displaying the password input interface for entering password on the touch screen comprises:
- arranging and displaying the receiving units according to an abacus pattern and a plurality of count beads,
- wherein at least one of the count beads arranged on an upper portion of the abacus pattern respectively represent a first number, and at least one of the count beads arranged on a lower portion of the abacus pattern respectively represent a second number.

11. The method of entering password as claimed in claim 7, wherein the step of displaying the password input interface for entering password on the touch screen comprises:
- arranging and displaying a plurality of blocks randomly, and arranging the receiving units respectively on the blocks, wherein the receiving units correspond to a plurality of symbols and the symbols comprise a plurality of numeral symbols, a confirm symbol and a cancel symbol.

12. A portable electronic device, comprising:
- a touch screen;
- a touch screen control circuit, coupled to the touch screen and configured to control the touch screen to display an interface for entering somatosensory password;
- a gravity measuring circuit, configured to measure an angle variation of the portable electronic device;
- a data storing circuit, coupled to the gravity measuring circuit and configured to record the measured angle variation of the portable electronic device if the measured angle variation exceeds a predetermined threshold and update a count value corresponding to a total number of the recorded angle variation of the portable electronic device on at least one dimension;
- a somatosensory signal generating circuit, coupled to the data storing circuit and configured to generate a somatosensory signal data set according to the recorded angle variation of the portable electronic device and the updated count value;
- a user password data generating circuit, coupled to the somatosensory signal generating circuit and configured to generate a user password data according to the somatosensory signal data set;
- an encrypting circuit, coupled to the user password data generating circuit and configured to encrypting the user password data according to an encryption algorithm to generate an encrypted user password data;
- a communication interface circuit, coupled to the encrypting circuit and configured to transmit the encrypted user password data to an authentication unit,
- wherein the authentication unit decrypts the encrypted user password data according a decryption algorithm to obtain the user password data, and verifies a user identification of the portable electronic device according to the user password data obtained;
- wherein the data storing circuit is further configured to update a count value corresponding to a total number of the recorded angle variation of the portable electronic device on each of the at least one dimension,
- wherein the somatosensory signal generating circuit is further configured to generate the somatosensory signal data set according to the recorded angle variation of the portable electronic device on each of the at least one dimension and the updated count value corresponding to the total number of the recorded angle variation of the portable electronic device on each of the at least one dimension.

13. The portable electronic device as claimed in claim 12, wherein the gravity measuring circuit is further configured to measure a first included angle of a body of the portable electronic device between a first orientation and a horizontal line,
- wherein the somatosensory signal generating circuit is further configured to determine whether the first included angle is larger than a first threshold value,
- the somatosensory signal generating circuit is further configured to add a first message to the somatosensory signal data set if the first included angle is larger than the first threshold value,
- wherein the somatosensory signal generating circuit is further configured to determine whether the first included angle is smaller than a second threshold value,
- the somatosensory signal generating circuit is further configured to add a second message to the somatosensory signal data set if the first included angle is smaller than the second threshold value.

14. The portable electronic device as claimed in claim 13, wherein the gravity measuring circuit measures a second included angle of the body of the portable electronic device between a second orientation and the horizontal line, wherein the first orientation is vertical to the second orientation, wherein the somatosensory signal generating circuit is further configured to determine whether the second included angle is larger than a third threshold value, the somatosensory signal generating circuit is further configured to add a third message to the somatosensory signal data set if the second included angle is larger than the third threshold value, wherein the somatosensory signal generating circuit is further configured to determine whether the second included angle is smaller than a fourth threshold value, the somatosensory signal generating circuit is further configured to add a fourth message to the somatosensory signal data set if the second included angle is smaller than the fourth threshold value.

15. The portable electronic device as claimed in claim 14, wherein the gravity measuring circuit is further configured to measure a third included angle between the body of the portable electronic device and a third orientation, wherein the somatosensory signal generating circuit is further configured to determine whether the third included angle is larger than a fifth threshold value, the somatosensory signal generating circuit is further configured to add a fifth message to the somatosensory signal data set if the third included angle is larger than the fifth threshold value, wherein the somatosensory signal generating circuit is further configured to determine whether the third included angle is smaller than a sixth threshold value, the somatosensory signal generating circuit is further configured to add a sixth message to the somatosensory signal data set if the third included angle is smaller than the sixth threshold value.

16. The portable electronic device as claimed in claim 12, wherein the touch screen control circuit is further configured to control the touch screen to display an initiate unit for entering somatosensory password and determine whether a touch signal corresponding to the initiate unit for entering somatosensory password is received, the touch screen is further configured to display the interface for entering somatosensory password if the touch signal corresponding to the initiate unit for entering somatosensory password is received by the touch screen control circuit.

17. The portable electronic device as claimed in claim 12, wherein the touch screen control circuit is further configured to control the touch screen to display a confirm unit and determine whether a touch signal corresponding to the confirm unit is received, the somatosensory signal generating circuit is further configured to generate the somatosensory signal data set if the touch signal corresponding to the confirm unit is received by the touch screen control circuit.

18. The portable electronic device as claimed in claim 12, further comprising:

an input password generating circuit, coupled to the touch screen control circuit and the user password data generating circuit;

wherein the touch screen control circuit is further configured to control the touch screen to display a password input interface for entering password having a plurality of receiving units and sense a touch operation corresponding to a portion of the receiving units on the touch screen, wherein the input password generating circuit is further configured to generate an input password set according to the touch operation, wherein the user password data generating circuit is further configured to generate the user password data according to the somatosensory signal data set and the input password set.

19. The portable electronic device as claimed in claim 18, wherein the touch screen control circuit is further configured to control the touch screen to arrange and display the receiving units according to a clock pattern, wherein the receiving units correspond to a plurality of symbols and the symbols comprise a plurality of numeral symbols, a confirm symbol and a cancel symbol.

20. The portable electronic device as claimed in claim 18, wherein the touch screen control circuit is further configured to control the touch screen to display a plurality of poker cards in a facing-down fashion, wherein the receiving units are arranged on the poker cards, wherein the touch screen control circuit is further configured to display at least a portion of the poker cards in a facing-up fashion on the touch screen based on the touch operation, wherein each of the portion of the poker cards in the facing-up fashion randomly displays one of a plurality of symbols and the symbols comprise a plurality of numeral symbols.

21. The portable electronic device as claimed in claim 18, wherein the touch screen control circuit is further configured to control the touch screen to arrange and display the receiving units according to an abacus pattern and a plurality of count beads, wherein at least one of the count beads arranged on an upper portion of the abacus pattern respectively represent a first number, and at least one of the count beads arranged on a lower portion of the abacus pattern respectively represent a second number.

22. The portable electronic device as claimed in claim 18, wherein the touch screen control circuit is further configured to control the touch screen to arrange and display a plurality of blocks randomly and to arrange the receiving units respectively on the blocks, wherein the receiving units correspond to a plurality of symbols and the symbols comprise a plurality of numeral symbols, a confirm symbol and a cancel symbol.

23. An unlocking method, for a portable electronic device including a touch screen, the unlocking method comprising:

receiving a password identification initiating signal;

measuring an angle variation of the portable electronic device;

recording the measured angle variation of the portable electronic device if the measured angle variation exceeds a predetermined threshold and updating a count value corresponding to a total number of the recorded angle variation of the portable electronic device on at least one dimension;

generating a somatosensory signal data set according to the recorded angle variation of the portable electronic device and the updated count value;

generating a user password data according to the somatosensory signal data set;

determining whether the user password data is identical to a preset content;

switching the touch screen to an unlock state if the user password data is identical to the preset content;

wherein the steps of updating the count value and generating the somatosensory signal data set comprises:

updating a count value corresponding to a total number of the recorded angle variation of the portable electronic device on each of the at least one dimension; and generating the somatosensory signal data set according to the recorded angle variation of the portable electronic device on each of the at least one dimension and the updated count value corresponding to the total number of the recorded angle variation of the portable electronic device on each of the at least one dimension.

24. The unlocking method as claimed in claim 23, wherein the step of receiving the password identification initiating signal comprises:

displaying an initiate unit on the touch screen if the touch screen is in the unlock state and determining whether a touch signal corresponding to the initiate unit is sensed, identifying that the password identification initiating signal is received if the touch signal corresponding to the initiate unit for entering somatosensory password is sensed.

25. The unlocking method as claimed in claim 23, further comprising:

displaying a confirm unit on the touch screen; and determining whether a touch signal corresponding to the confirm unit is detected;

wherein the step of generating a somatosensory signal data set is performed after the touch signal is detected.

26. The unlocking method as claimed in claim 23, the steps of measuring the angle variation of the portable electronic device and generating the somatosensory signal data set comprises:

measuring a first included angle of a body of the portable electronic device between a first orientation and a horizontal line;

determining whether the first included angle is larger than a first threshold value;

adding a first message to the somatosensory signal data set if the first included angle is larger than the first threshold value;

determining whether the first included angle is smaller than a second threshold value;

adding a second message to the somatosensory signal data set if the first included angle is smaller than the second threshold value.

27. The unlocking method as claimed in claim 26, the steps of measuring the angle variation of the portable electronic device and generating the somatosensory signal data set further comprises:

measuring a second included angle of the body of the portable electronic device between a second orientation and the horizontal line, wherein the first orientation is vertical to the second orientation;

determining whether the second included angle is larger than a third threshold value;

adding a third message to the somatosensory signal data set if the second included angle is larger than the third threshold value;

determining whether the second included angle is smaller than a fourth threshold value;

adding a fourth message to the somatosensory signal data set if the second included angle is smaller than the fourth threshold value.

28. The unlocking method as claimed in claim 27, the steps of measuring the angle variation of the portable electronic device and generating the somatosensory signal data set further comprises:

measuring a third included angle between a third orientation and the body of the portable electronic device;

determining whether the third included angle is larger than a fifth threshold value;

adding a fifth message to the somatosensory signal data set if the third included angle is larger than the fifth threshold value;

determining whether the third included angle is smaller than a sixth threshold value;

adding a sixth message to the somatosensory signal data set if the third included angle is smaller than the sixth threshold value.

29. A data authenticating method for a portable electronic device including a touch screen, the data authenticating method comprising:

locking a preset functional module;

displaying an interface for entering somatosensory password;

measuring an angle variation of the portable electronic device;

recording the measured angle variation of the portable electronic device if the measured angle variation exceeds a predetermined threshold and updating a count value corresponding to a total number of the recorded angle variation of the portable electronic device on at least one dimension;

generating a somatosensory signal data set according to the recorded angle variation of the portable electronic device and the updated count value;

generating a user password data according to the somatosensory signal data set;

transmitting the user password data to an authentication unit, wherein the authentication unit has an authentication code, the authentication unit performs a verification to a user identification of the portable electronic device according the authentication code and the user password data obtained, and permits the preset functional module for executing after the user identification has been verified;

wherein the steps of updating the count value and generating the somatosensory signal data set comprises:

updating a count value corresponding to a total number of the recorded angle variation of the portable electronic device on each of the at least one dimension; and generating the somatosensory signal data set according to the recorded angle variation of the portable electronic device on each of the at least one dimension and the updated count value corresponding to the total number of the recorded angle variation of the portable electronic device on each of the at least one dimension.

* * * * *